United States Patent [19]

Onishi et al.

[11] Patent Number: 5,624,974

[45] Date of Patent: Apr. 29, 1997

[54] PHOTOPOLYMERIZABLE RESIN MATERIAL COMPOSITION COMPRISING FLUORINATED (METH)ACRYLATES

[75] Inventors: Noriaki Onishi, Nara; Nobuaki Yamada, Higashiosaka; Shuichi Kohzaki, Nara; Daisaku Matsunaga, Minato-ku; Takao Aizawa, Kumagaya; Toru Ozaki, Kitakatsushika-gun, all of Japan

[73] Assignees: Sharp Kabushiki Kaisha, Osaka; Nippon Kayaku Co., Ltd., Tokyo, both of Japan

[21] Appl. No.: 578,972

[22] Filed: Dec. 27, 1995

[30] Foreign Application Priority Data

Dec. 28, 1994 [JP] Japan ................................. 6-328586
Dec. 12, 1995 [JP] Japan ................................. 7-323390

[51] Int. Cl.$^6$ ................................. C08F 2/50; C08F 220/22
[52] U.S. Cl. ................................. 522/96; 522/182; 522/183; 526/245; 526/246; 430/281.1; 430/284.1; 430/288.1; 428/1; 349/182
[58] Field of Search ................................. 522/183, 182, 522/96; 526/245, 246; 430/281.1, 284.1, 288.1; 428/1; 359/90, 103

[56] References Cited

U.S. PATENT DOCUMENTS

| | | | |
|---|---|---|---|
| 4,855,376 | 8/1989 | De Martino et al. | 522/246 |
| 5,264,512 | 11/1993 | Le Barny et al. | 526/245 |
| 5,268,783 | 12/1993 | Yoshinaga et al. | 359/103 |
| 5,447,655 | 9/1995 | Sato et al. | 526/245 |
| 5,466,496 | 11/1995 | Jin | 522/182 |
| 5,473,448 | 12/1995 | Yoshinaga et al. | 359/51 |
| 5,475,515 | 12/1995 | Yoshinaga et al. | 359/52 |
| 5,518,652 | 5/1996 | Parri et al. | 526/246 |
| 5,540,858 | 7/1996 | Yoshinaga et al. | 359/104 |

FOREIGN PATENT DOCUMENTS

| | | |
|---|---|---|
| 58-501631 | 9/1983 | Japan . |
| 61-502128 | 9/1986 | Japan . |
| 1-269922 | 10/1989 | Japan . |
| 2-310520 | 12/1990 | Japan . |
| 4-212928 | 8/1992 | Japan . |
| 4-338923 | 11/1992 | Japan . |
| 5-27242 | 2/1993 | Japan . |
| 5-257135 | 10/1993 | Japan . |
| 6-301015 | 10/1994 | Japan . |
| WO83/01016 | 3/1983 | WIPO . |
| WO85/04262 | 9/1995 | WIPO . |

*Primary Examiner*—Susan W. Berman
*Attorney, Agent, or Firm*—David G. Conlin; George W. Neuner

[57] ABSTRACT

A photopolymerizable resin material composition for forming a polymer used for a liquid crystal display apparatus includes at least one acrylate compound selected from the group consisting of a bifunctional acrylate compound having a fluorine substitution ratio $\alpha$ in the range of $0.1 < \alpha < 0.8$, a bifunctional acrylate compound having a fluorine substitution ratio $\alpha$ in the range of $0 \leq \alpha < 0.8$, a bifunctional acrylate compound having a fluorine substitution ratio $\alpha$ in the range of $0.1 < \alpha < 0.8$, a bifunctional acrylate compound having a fluorine substitution ratio $\alpha$ in the range of $0.1 < \alpha < 0.8$ and a bifunctional acrylate compound having a fluorine substitution ratio $\alpha$ in the range of $0.1 < \alpha < 0.8$ and a bifunctional acrylate compound having a fluorine substitution ratio $\alpha$ in the range of $0.1 < \alpha < 0.8$, and a photopolymerization delaying resin material.

4 Claims, 6 Drawing Sheets

A   B

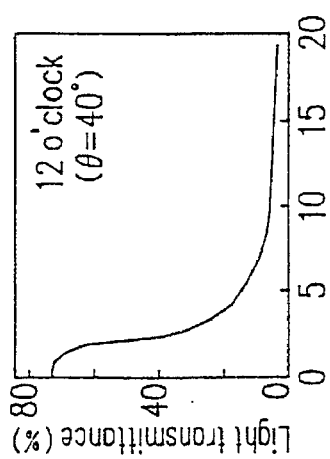
FIG.5B
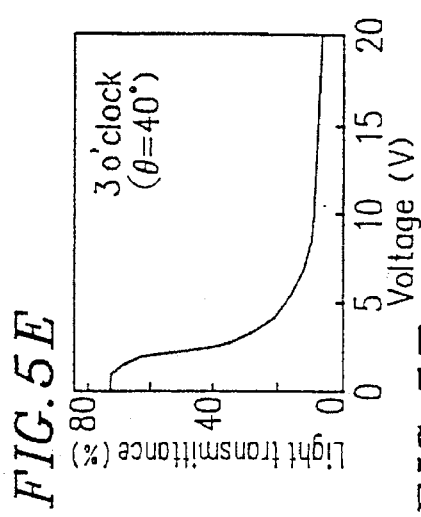
FIG.5A
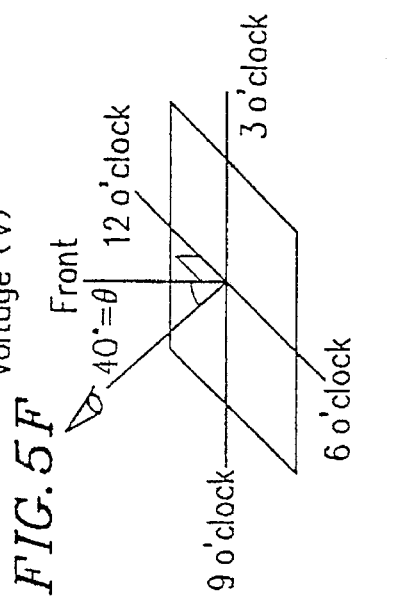
FIG.5E
FIG.5F
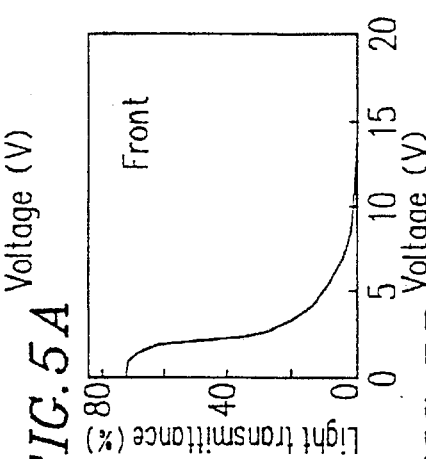
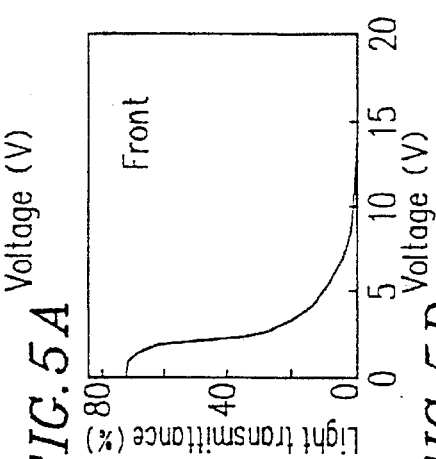
FIG.5C
FIG.5D
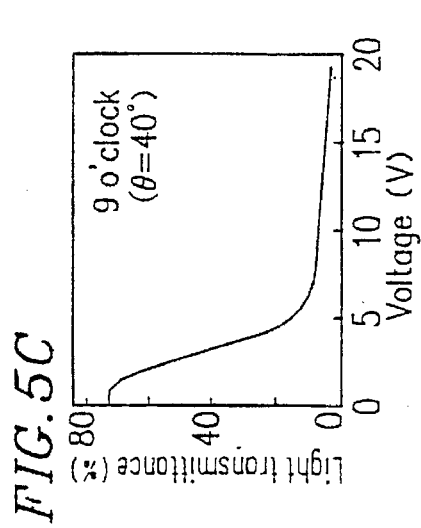

Analyzer transmission
axis direction

Polarizer transmission
axis direction

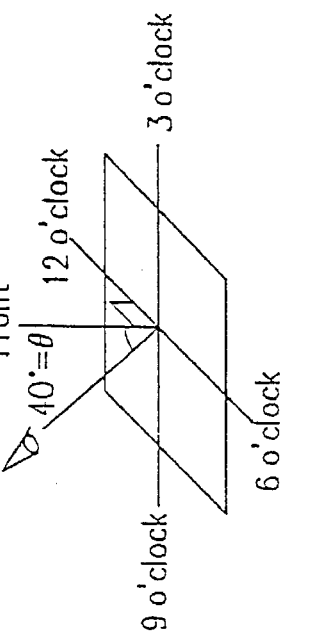
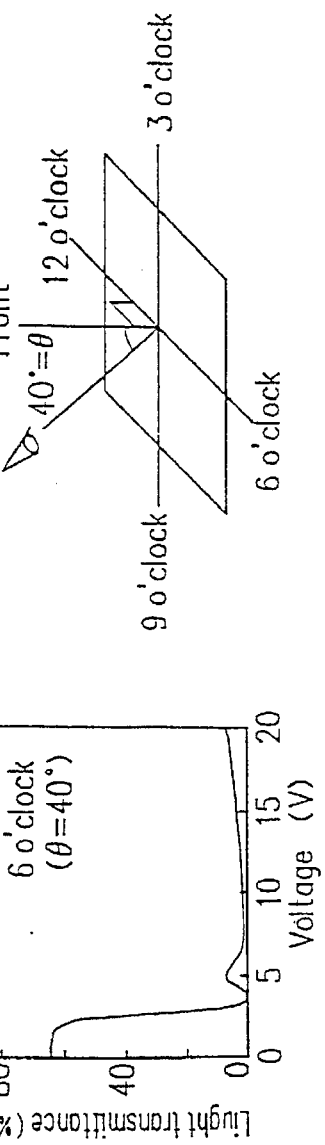
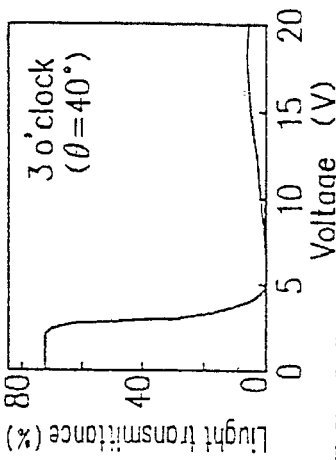
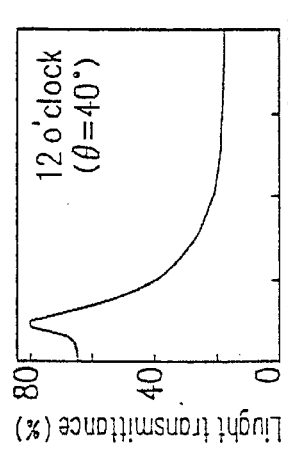
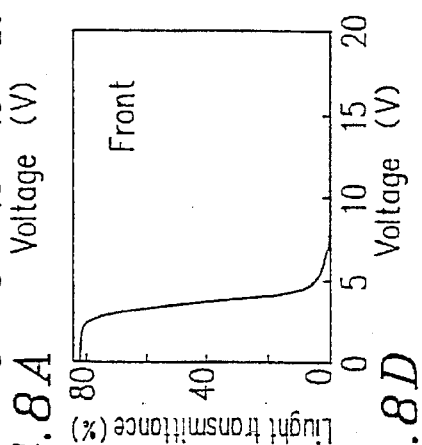
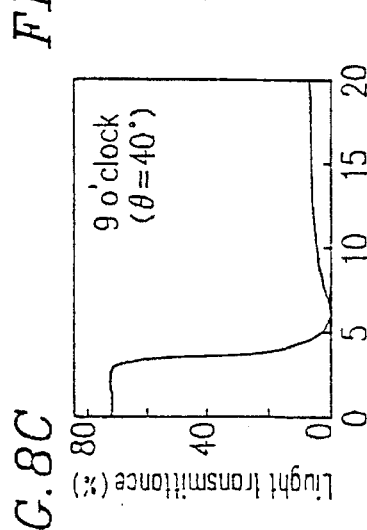

PHOTOPOLYMERIZABLE RESIN MATERIAL COMPOSITION COMPRISING FLUORINATED (METH)ACRYLATES

BACKGROUND OF THE INVENTION

1. Field of the Invention

The present invention relates to a liquid crystal apparatus using a liquid crystal material and a polymer material. More specifically, the present invention relates to a photopolymerizable resin material composition for forming a liquid crystal display apparatus having liquid crystal regions surrounded by polymer walls and to a matrix-type liquid crystal display apparatus.

2. Description of the Related Art

As for methods for producing a liquid crystal display apparatus, one for producing a polymer-dispersed liquid crystal display apparatus has been known. According to this method, a mixture of a photocurable or thermosetting resin material is used. Among the mixture, only the resin material is cured so as to be phase-separated from the liquid crystal material, whereby liquid crystal droplets are formed between cured and deposited polymers.

In a conventional liquid crystal display apparatus, orientation of liquid crystal molecules and display color are likely to change during a pen input and cell thickness is likely to change in upper and/or lower portions of a display apparatus due to weight, causing unevenness in the display. However, in the polymer-dispersed liquid crystal display apparatus produced by the phase-separation method, liquid crystal molecules are held in polymers, so that cell thickness is not likely to change, resulting in enhanced display stability of the liquid crystal apparatus with respect to an external force.

As a polymer-dispersed liquid crystal display apparatus, Japanese National Publication No. 58-501631 discloses one displaying a scattered state under the application of no voltage, in which a refractive index of liquid crystal is not matched with that of a polymer and displaying a transparent state under the application of a voltage, in which the refractive index of the liquid crystal changes so as to be matched with that of the polymer.

As methods for forming the polymer-dispersed liquid crystal display apparatus, two methods have been disclosed: Japanese National Publication No. 61-502128 discloses that UV-rays are radiated upon a mixture of liquid crystal and a photocurable resin so that the liquid crystal is phase-separated from the photocurable resin three-dimensionally; and Japanese Laid-Open Patent Publication No. 2-310520 discloses that UV-rays are radiated upon a mixture of a photocurable resin containing liquid crystal and a (meth)acrylate compound so that the liquid crystal is phase-separated from the polymer three-dimensionally. These apparatuses electrically control a scattered state and a transparent state, and therefore, they use materials capable of forming smaller liquid crystal droplets so as to enhance scattering characteristics under the application of no voltage.

In the case where a conventional polymer-dispersed liquid crystal display apparatus is to be utlized a mode in which liquid crystal molecules are required to be aligned in different directions relative to the substrates sandwiching the liquid crystal, such as a TN mode and an STN mode, it is difficult to form liquid crystal droplets in a uniform manner, to exactly control the positions of the liquid crystal droplets, and to perform alignment treatment of the liquid crystal molecules due to the limitations of the production method. This causes various problems. For example, in the conventional polymer-dispersed liquid crystal display apparatus, it is difficult to form liquid crystal droplets in a uniform manner and to exactly control the positions of the liquid crystal droplets. Therefore, a drive voltage varies depending upon the liquid crystal droplet. This causes a lack of abruptness in the threshold response for various electrooptical characteristics, relatively increased drive voltage, and difficulty in enlarging a screen in a high definition state.

Furthermore, since a number of liquid crystal droplets having a low light-scattering ability are present, contrast of the display relatively decreases.

Furthermore, since it is difficult to control the orientation of liquid crystal molecules, viewing angle characteristics are poor and contrast decreases due to depolarization caused by scattering at interfaces between the liquid crystal molecules and the polymer. Specifically, when the polymer is present between the substrates and the liquid crystal in the polymer dispersed liquid crystal apparatus, alignment treatment cannot be performed with respect to the substrates. In order to solve the problem of scattering at interfaces between the liquid crystal molecules and the polymer, the interfaces therebetween in pixels may be reduced. However, according to a conventional method, since liquid crystal droplets are naturally formed, it is difficult to reduce the interfaces.

Furthermore, in a liquid crystal apparatus using ferroelectric liquid crystal, shock resistance is weakened because of the high regulating ability of a liquid crystal phase (smectic phase) to be used.

In order for the above-mentioned polymer dispersed liquid crystal display apparatus to have regulating ability, it has been disclosed to use a photomask through which UV-rays are radiated to a mixture of liquid crystal and a photocurable resin material so as to deposit a polymer.

Japanese Laid-Open Patent Publication No. 1-269922 discloses a method including the steps of radiating UV-rays upon the mixture through a photomask, removing the photomask, and then radiating UV-rays onto portions which have been covered with the photomask, thereby forming regions having different characteristics. Also disclosed is a liquid crystal display apparatus produced by the method. This apparatus is the type driven in a scattering-transmission mode.

Japanese Laid-Open Patent Publication No. 5-257135 discloses a liquid crystal device produced by injecting a mixture of a liquid crystal material and a photocurable resin between substrates on which an alignment film having an alignment regulating force is respectively formed and using UV-rays to radiate the mixture through a photomask. This device is the type for static drive in which patterning is performed from outside a cell because threshold characteristics inside the photomask are different from those outside the photomask.

In general, in order to improve viewing angle characteristics in a liquid crystal apparatus of a non-scattering mode by enhancing an orientation state of liquid crystal molecules, the liquid crystal molecules are required to be aligned in at least three directions in the pixels. For example, referring to FIG. 1A–1C, liquid crystal molecules 13 are aligned differently depending upon the liquid crystal region surrounded by a polymer 12 between two substrates 11. In such an orientation state, an apparent refractive index of the liquid crystal molecules is averaged when they are seen in directions A and B in an intermediate gray scale. As a result, the contrasts seen from both directions A and B become identical, and viewing angle characteristics are enhanced, compared with a liquid crystal display apparatus in a TN mode shown in FIG. 2A–2C.

Japanese Laid-Open Patent Publication Nos. 4-338923 and 4-212928 disclose wide viewing angle liquid crystal display apparatuses in which viewing angle characteristics are improved by attaching two polarizing plates to the polymer dispersed liquid crystal display apparatus so that the plates are orthogonal to each other.

Furthermore, Japanese Laid-Open Patent Publication No. 5-27242 discloses a method for producing a non-scattering liquid crystal apparatus made of a composite material of liquid crystal and a polymer material, utilizing phase separation of a mixture containing liquid crystal and a photocurable resin. According to this method, the generated polymer randomly align liquid crystal domains and liquid crystal molecules rise in different directions depending upon each domain under the application of a voltage. Therefore, an apparent refractive index from each direction becomes equal, and viewing angle characteristics are improved in an intermediate gray scale.

In recent years, the present inventors found the following: By using a photomask during photopolymerization of a mixture of liquid crystal and a photocurable resin material, liquid crystal molecules in a liquid crystal device to be obtained are omnidirectionally aligned (in a spiral shape) in pixel regions. This spiral orientation of the liquid crystal molecules is controlled with a voltage, whereby the liquid crystal molecules move as if part of umbrellas which are opened or closed. Thus, a matrix-type liquid crystal display apparatus with improved viewing angle characteristics is obtained (Japanese Laid-Open Patent Publication No. 6-301015). However, this apparatus has problems with respect to contrast, response time, roughness, and the like because of a resin material mixed into a liquid crystal material.

Thus, as described above, in a polymer dispersed liquid crystal display apparatus in a non-scattering mode, the following methods have been demanded: a method for forming liquid crystal droplets in a uniform shape and exactly regulating the positions of liquid crystal droplets, a method for aligning liquid crystal molecules omnidirectionally in pixels which is required for improving viewing angle characteristics, and a method for preventing contrast from decreasing due to depolarization caused by scattering at interfaces between liquid crystal molecules and a polymer.

SUMMARY OF THE INVENTION

In order to solve the above-mentioned problems, the inventors earnestly studied a method for making the size of intended liquid crystal droplets approximately the same as that of pixels and regularly positioning almost one liquid crystal droplet for one pixel. As a result, the inventors have found the following two methods remarkably effective: (1) UV-rays having a UV-radiation pattern corresponding to liquid crystal droplets (which are approximately the same size as that of pixels) are radiated while pixel regions are blocked, whereby a liquid crystal display apparatus which has liquid crystal regions surrounded by polymer walls is obtained; and (2) A material having different surface free energy with respect to a liquid crystal phase and an isotropic phase is previously patterned on a substrate, and a liquid crystal phase is positioned, based on this surface pattern, i.e., free energy is patterned, whereby a liquid crystal display apparatus having liquid crystal regions surrounded by polymer walls is obtained.

Furthermore, the inventors have found that by using a certain photopolymerization resin composition for producing a liquid crystal display apparatus by these methods, the above-mentioned problems can be effectively solved.

The photopolymerizable resin material composition for forming a polymer used for a liquid crystal display apparatus of this invention, includes at least one acrylate compound selected from the group consisting of a bifunctional acrylate compound represented by the following general Formula I having a fluorine substitution ratio $\alpha$ in the range of $0.1 < \alpha < 0.8$, a bifunctional acrylate compound represented by the following general Formula II having a fluorine substitution ratio $\alpha$ in the range of $0 \leq \alpha < 0.8$, a bifunctional acrylate compound represented by the following general Formula III having a fluorine substitution ratio $\alpha$ in the range of $0.1 < \alpha < 0.8$, a bifunctional acrylate compound represented by the following general Formula IV having a fluorine substitution ratio $\alpha$ in the range of $0.1 < \alpha < 0.8$ and a bifunctional acrylate compound represented by the following general Formula V having a fluorine substitution ratio $\alpha$ in the range of $0.1 < \alpha < 0.8$ and a bifunctional acrylate compound represented by the following general Formula VI having a fluorine substitution ratio $\alpha$ in the range of $0.1 < \alpha < 0.8$, and a photopolymerization delaying resin material represented by the following general Formula VII:

where A is an acrylate group or a methacrylate group; B is an alkylene group, an alkyleneoxyalkylene group, alkyleneoxyalkyleneoxyalkylene group, an alkylenecarbonyloxyalkylene group, or carbonyloxyalkylene group; $X^1$ is an alkylene group substituted with fluorine; and E is an alkylene group, an alkyleneoxyalkylene group, an alkylenecarbonyloxyalkylene group, or a carbonyloxyalkylene group,

where A is an acrylate group or a methacrylate group; and $Y^1$ is an alkyl group substituted with fluorine, an alkyl group, an aryloxy group, an alkyloxy group containing 8 to 13 carbon atoms, a phenoxy group, an alkyl phenoxy group, or a $Z^1O(C_2H_4O)_p$ group (where $Z^1$ is a phenyl group or a dodecyl group and p is an integer of 5 to 15),

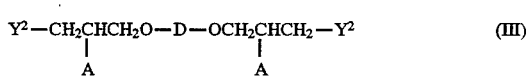

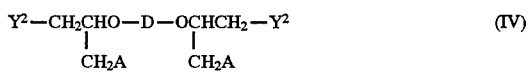

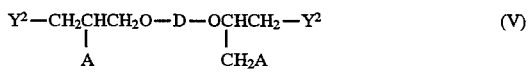

where A is an acrylate group or a methacrylate group, $Y^2$ is an alkyl group substituted with fluorine; and D is a —CONH(CH$_2$)$_6$NHCO— group, a mixture of —CONHCH$_2$C(CH$_3$)$_2$—CH$_2$CH(CH$_3$)CH$_2$CH$_2$NHCO— group and —CONHCH$_2$CH(CH$_3$)—CH$_2$CH(CH$_3$)$_2$CH$_2$CH$_2$NHCO— group,

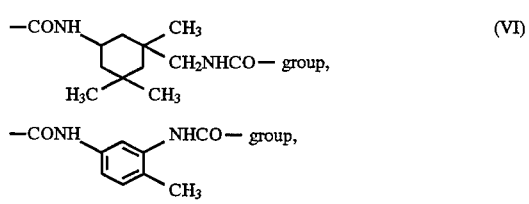

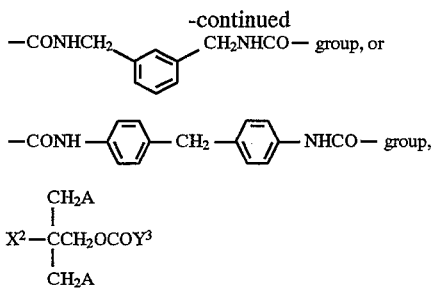 —CONHCH₂—⟨ring⟩—CH₂NHCO— group, or

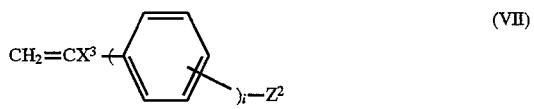 —CONH—⟨ring⟩—CH₂—⟨ring⟩—NHCO— group, $$X^2-\overset{CH_2A}{\underset{CH_2A}{CCH_2OCOY^3}}$$

where A is an acrylate group or a methacrylate group; $X^2$ is an alkyl group or an alkylcarbonyloxyalkylene group; and $Y^3$ is an alkyl group substituted with fluorine,

$CH_2=CX^3$—⟨ring⟩$_i$—$Z^2$ (VII)

where $X^3$ is hydrogen, a methyl group, or a phenyl group; $Z^2$ is hydrogen, an alkyl group substituted with fluorine, an alkyl group, an alkoxy group substituted with fluorine, an alkyl group substituted with phenyl, a —C(CH₃)₂—NHCOOR group (where R is an alkyl group and an alkyl group substituted with fluorine),

—C(CH₃)₂—NHCOOCH₂C(CH₃)₂CH₂OCONHC(CH₃)₂—

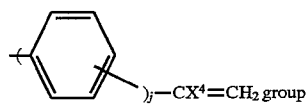 ⟨ring⟩$_j$—CX⁴=CH₂ group or —C(CH₃)₂NHCOOC₂H₄OCOCX⁴=CH₂ group (where $X^4$ is hydrogen or a methyl group, and j is an integer of 1 or 2), and i is an integer of 1 or 2.

A cured material obtained by photopolymerizing the photopolymerizable resin material composition.

A liquid crystal display apparatus having a liquid crystal region surrounded by a cured material obtained by photopolymerizing the photopolymerizable resin material composition.

In one embodiment, orientation of liquid crystal molecules in the liquid crystal region surrounded by the cured material are axially symmetrical.

By producing a liquid crystal display apparatus, using the photopolymerizable resin material composition of the present invention, the following advantages can be obtained:

1) A resin material is not likely to be mixed in liquid crystal regions in a liquid crystal display apparatus in which liquid crystal molecules have axially symmetrical orientation in the liquid crystal regions. This remarkably enhances contrast of the apparatus.

2) By using a certain acrylate compound, anchoring strength between a polymer and liquid crystal, response time, and drive voltage can be decreased. In addition, the orientation of the liquid crystal regions is stabilized and a uniform orientation state can be obtained.

Because of the above, a liquid crystal apparatus with improved viewing angle characteristics can be obtained.

Thus, the invention described herein makes possible the advantages of providing (1) a photopolymerizable resin material composition for a liquid crystal display apparatus capable of controlling the size, position, and the like of liquid crystal droplets formed in a three-dimensional matrix in pixels; and providing (2) a matrix drive type liquid crystal display apparatus with liquid crystal orientation and scattering strength controlled.

These and other advantages of the present invention will become apparent to those skilled in the art upon reading and understanding the following detailed description with reference to the accompanying figures.

BRIEF DESCRIPTION OF THE DRAWINGS

FIGS. 5A through 5F show schematic diagrams showing electrooptical characteristics (viewing angle characteristics) of a liquid crystal cell produced in Example 1.

FIGS. 8A through 8F show schematic diagrams showing electrooptical characteristics (viewing angle characteristics) of a TN liquid crystal cell produced in Comparative Example 1.

DESCRIPTION OF THE PREFERRED EMBODIMENTS

Figure 1A:
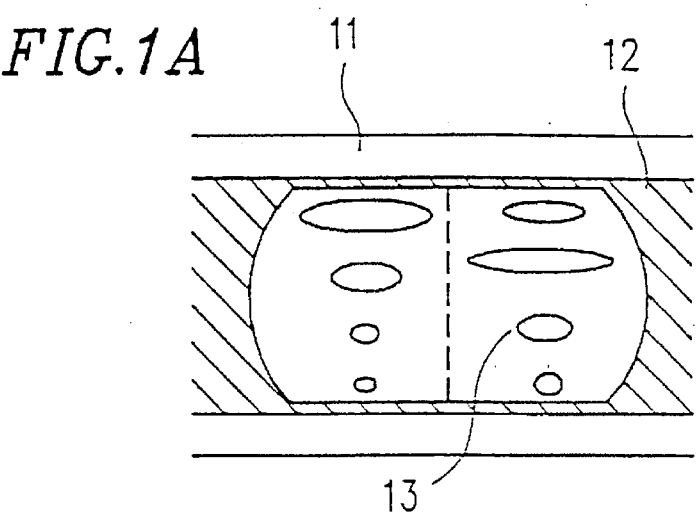
FIGS. 1A through 1C are views illustrating changes in contrast at various viewing angles in a wide view angle mode.
Figure 1B:
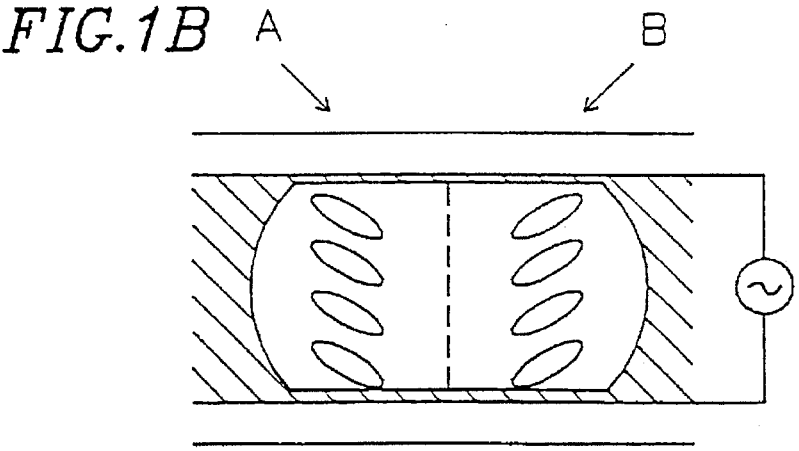
Figure 1C:
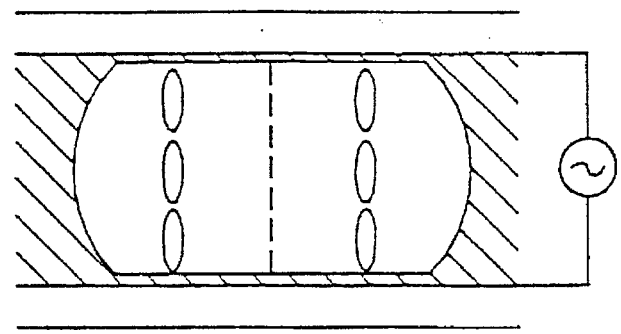
Figure 2A:
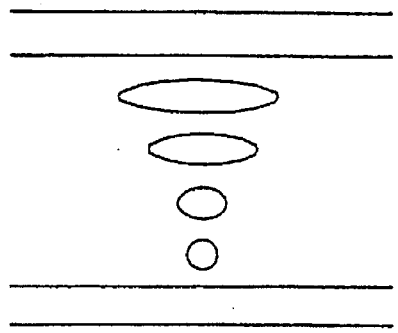
FIGS. 2A through 2C are views illustrating changes in contrast at various viewing angles in a TN mode.
Figure 2B:
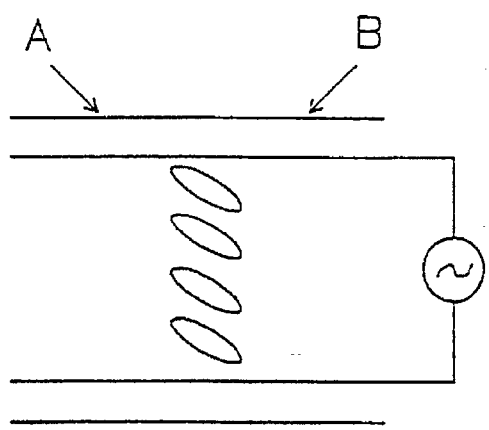
Figure 2C:
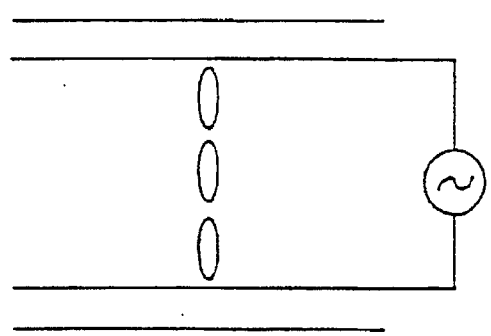

In order to achieve the above-mentioned objective, the photopolymerizable resin material composition of the present invention preferably satisfies the following basic characteristics:

(1) The composition has a specific resistance of $1\times10^{11}\Omega\cdot cm$ or more both in an uncured state and in a cured state.

(2) In order to enhance heat resistance of a matrix polymer to be formed by polymerization and phase separation, the composition preferably contains at least one polymerizable resin material so as to allow the polymer to have a glass transition point ($T_g$) of 60° C. or higher.

(3) The liquid crystal material and the polymerizable resin material are injected into a cell under reduced pressure during production of a liquid crystal apparatus, so that the composition preferably contains at least one polymerizable resin material having resistance to reduced pressure and a high boiling point.

(4) In order to ensure satisfactory phase separation between the liquid crystal material and the polymerizable resin material, a fluorinated resin or a fluorinated polymerizable resin material is preferably added to the composition.

(5) In order to form liquid crystal droplets corresponding to pixels, a polymerization retarding resin material (polymerization suppressant) capable of retarding a photopolymerization speed is added to the composition.

In order to satisfy the above-mentioned basic characteristics, the photopolymerizable resin material composition of the present invention contains at least one bifunctional acrylate compound represented by Formulae I to VI (shown above) and a photopolymerization delaying resin material. From Formulae I to VI, fluorine substitution ratio α is represented by the following Equation i:

$$\alpha = \frac{\text{Number of fluorine atoms in an acrylate compound}}{\text{Total number of sites capable of being substituted with fluorine atoms in an acrylate compound}} \quad (i)$$

(Bifunctional acrylate compound)

In the present specification, the term "alkylene" refers to (poly)methylene such as methylene, dimethylene, and trimethylene.

In the present specification, the term "acrylate compound" refers to a compound having an acrylate group or a methacrylate group.

(1) Acrylate compound represented by Formula I

In Formula I, A is an acrylate group or a methacrylate group.

In Formula I, B is an alkylene group, an alkyleneoxyalkylene group, an alkyleneoxyalkyleneoxyalkylene group, alkylenecarbonyloxyalkylene group, or a carbonyloxyalkylene group. An example of the alkylene group denoted by B is a $C_1$–$C_4$ alkylene group; an example of the alkyleneoxyalkylene group denoted by B is $C_1$–$C_4$ alkylene)oxy($C_1$–$C_4$ alkylene) group; an example of the alkyleneoxyalkyleneoxyalkylene group denoted by B is ($C_1$–$C_4$ alkylene)oxy ($C_1$–$C_4$ alkylene)oxy($C_1$–$C_4$ alkylene) group; an example of the alkylenecarbonyloxyalkylene group denoted by B is ($C_4$–$C_8$ alkylene)carbonyloxy($C_1$–$C_4$ alkylene) group; and an example of the carbonyloxyalkylene group denoted by B is a carbonyloxy($C_1$–$C_4$ alkylene) group.

In Formula I, $X^1$ is an alkylene group substituted with fluorine. An example of the alkylene group substituted with fluorine is a $C_1$–$C_{11}$ alkylene group fully substituted with fluorine.

In Formula I, E is an alkylene group, an alkyleneoxyalkylene group, an alkylenecarbonyloxyalkylene group, or a carbonyloxyalkylene group.

An example of the alkylene group denoted by E is a $C_1$–$C_4$ alkylene group; an example of the alkyleneoxyalkylene group denoted by E is a ($C_1$–$C_4$ alkylene)oxy($C_1$–$C_4$ alkylene) group; an example of the alkylenecarbonyloxyalkylene group is a ($C_4$–$C_8$ alkylene)carbonyloxy($C_1$–$C_4$ alkylene) group; and an example of the carobnyloxyalkylene group denoted by E is a carbonyloxy($C_1$–$C_4$ alkylene).

In a preferred compound represented by Formula I, A is an acrylate group or a methacrylate group; B is an alkylene group, an alkyleneoxyalkylene group, or an alkylenecarbonyloxyalkylene group; $X^1$ is an alkylene group substituted with fluorine; and E is an alkylene group, alkyleneoxyalkylene group, or an alkylenecarbonyloxyalkylene group. In a more preferred compound represented by Formula I, A is an acrylate group or a methacrylate group; B is an alkylene group or an alkyleneoxyalkylene group; $X^1$ is an alkylene group substituted with fluorine; and E is an alkylene group, an alkyleneoxyalkylene group, or an alkylenecarbonyloxyalkylene group. In a still more preferred compound represented by Formula I, A is an acrylate group or a methacrylate group; B is an alkylene group; $X^1$ is an alkylene group substituted with fluorine; and E is an alkylene group.

Examples of the bifunctional acrylate compounds represented by Formula I include the following compounds:

$H_2C\!=\!CHCOOC_2H_4(CF_2)_4C_2H_4OCOCH\!=\!CH_2$, $H_2C\!=\!CHCOOC_2H_4(CF_2)_6C_2H_4OCOCH\!=\!CH_2$, $H_2C\!=\!CHCO(OC_2H_4)_mOC_2H_4(CF_2)_4C_2H_4O(C_2H_4O)_nCOCH\!=\!CH_2$ (where m and n are independently integers of 1 to 3, and m+n is 3 or 4),

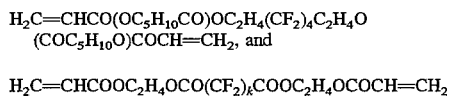

$H_2C\!=\!CHCOOC_2H_4OCO(CF_2)_kCOOC_2H_4OCOCH\!=\!CH_2$ (where k is an integer of 4 to 11)

and methacrylate compounds in which hydrogen in α-position of the above-mentioned compounds is substituted with a methyl group.

(2) Acrylate compound represented by Formula II

In Formula II, A is an acrylate group or a methacrylate group.

In Formula II, $Y^1$ is an alkyl group substituted with fluorine, an alkyloxy group substituted with fluorine, an alkyl group, an aryloxy group, a $C_8$–$C_{13}$ alkyloxy group, a phenoxy group, an alkylphenoxy group, or a $Z^1O(C_2H_4O)_p$ group (where $Z^1$ is a phenyl group or a dodecyl group, and p is an integer of 5 to 15). An example of the alkyl group substituted with fluorine denoted by $Y^1$ is a $C_2$–$C_9$ alkyl group fully substituted with fluorine; an example of an alkyloxy group substituted with fluorine is a $C_3$–$C_9$ alkyloxy group partially substituted with fluorine, preferably, —O—$CH_2$—$(CF_2)_h$—$CHF_2$ (h is an integer of 1 to 7); an example of the alkyl group denoted by $Y^1$ is a $C_1$–$C_{15}$ alkyl group; and an example of the alkylphenoxy group denoted by $Y^1$ is a phenoxy group substituted with ($C_1$–$C_4$ alkyl).

In a preferred compound represented by Formula II, A is an acrylate group or a methacrylate group, and $Y^1$ is an alkyl group substituted with fluorine.

Examples of the bifunctional compound represented by Formula II include the following compounds:

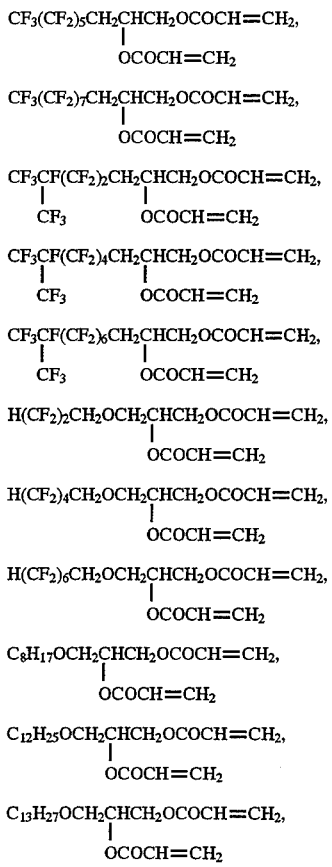

-continued

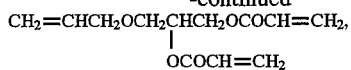

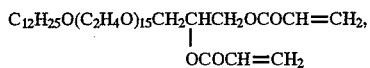

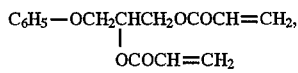

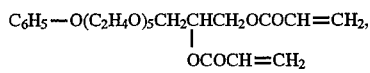

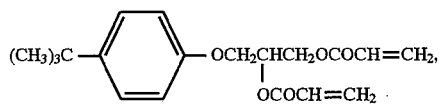

and methacrylate compounds in which hydrogen in α-position of the above-mentioned compounds is substituted with a methyl group.

(3) Acrylate compounds represented by Formulae III, IV, and V

In Formulae III, IV, and V, A is an acrylate group or a methacrylate group.

In Formulae III, IV, and V, $Y^2$ is an alkyl group substituted with fluorine. An example of the alkyl group substituted with fluorine denoted by $Y^2$ is a $C_2$–$C_9$ alkyl group fully substituted with fluorine.

Examples of the bifunctional acrylate compound represented by Formula III include the following compounds:

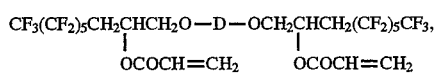

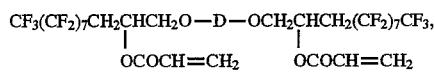

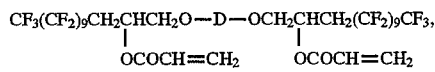

and methacrylate compounds in which hydrogen in α-position of the above-mentioned compounds is substituted with a methyl group.

Examples of the bifunctional acrylate compound represented by Formula IV include the following compounds:

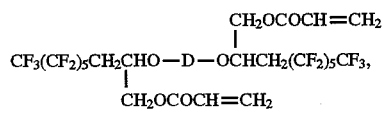

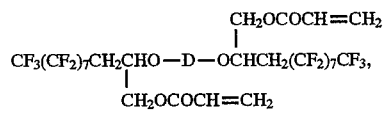

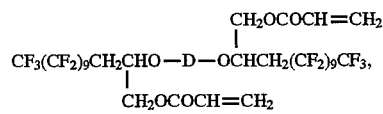

and methacrylate compounds in which hydrogen in α-position of the above-mentioned compounds is substituted with a methyl group.

Examples of the bifunctional acrylate compound represented by Formula V include the following compounds:

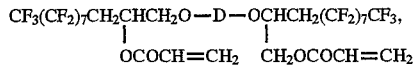

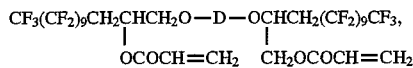

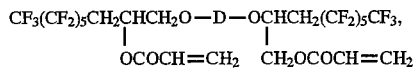

and methacrylate compounds in which hydrogen in α-position of the above-mentioned compounds is substituted with a methyl group.

Here, in Formulae III to V, D can be —C—ONH(CH$_2$)$_6$NHCO— group, a mixed group of a —C—ONHCH$_2$C(CH$_3$)$_2$CH$_2$CH(CH$_3$)CH$_2$CH$_2$NHCO— group and a —C—ONHCH$_2$CH(CH$_3$)CH$_2$C(CH$_3$)$_2$CH$_2$CH$_2$NHCO— group,

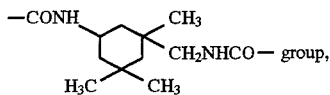

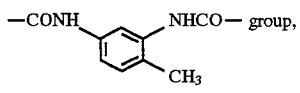

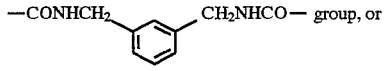

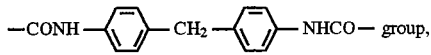

(4) Acrylate compound represented by Formula VI

In Formula VI, A is an acrylate group or a methacrylate group.

In Formula VI, $X^2$ is an alkyl group or an alkylcarbonyloxyalkylene group. An example of the alkyl group denoted by $X^2$ is a $C_1$–$C_4$ alkyl group; and an example of an alkylcarbonyloxyalkylene group denoted by $X^2$ is a ($C_4$–$C_8$ alkyl)carbonyloxy($C_1$–$C_4$ alkylene) group.

In Formula VI, $Y^3$ is an alkyl group substituted with fluorine. Examples of the alkyl group substituted with fluorine include a $C_1$–$C_{10}$ alkyl group fully substituted with fluorine and a $C_2$–$C_{10}$ alkyl group partially substituted with fluorine. In the case of the alkyl group partially substituted with fluorine, the number of fluorine substitutions is preferably 3 to 19.

Examples of the bifunctional acrylate compound represented by Formula VI include the following compounds:

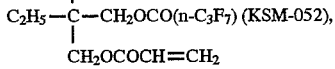

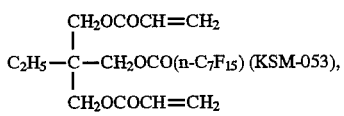

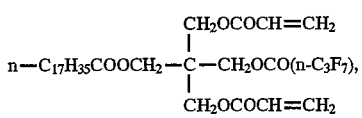

-continued

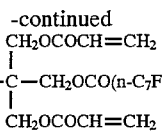

and methacrylate compounds in which hydrogen in α-position of the above-mentioned compounds is substituted with a methyl group.

Among the compounds represented by Formulae I to VI, those represented by Formulae I, II, and VI are preferred. The compound represented by Formula I is more preferred.

Although not particularly limited, the content of the acrylate compound in the photopolymerizable resin material composition is preferably in the range of 3% to 60% by weight based on the total weight of the composition. The content is more preferably in the range of 5% to 50% by weight. When the content is in the range of 3% to 60% by weight, homeotropic orientation and homogeneity of liquid crystal molecules in the liquid crystal droplets become satisfactory. This suppresses the formation of disclination lines, providing a liquid crystal display apparatus with excellent display performance having liquid crystal regions surrounded by polymer walls. When the content is more than 60% by weight, the compatibility of the acrylate compound with the liquid crystal material or other resin materials decreases, which makes it difficult to uniformly mix those materials used for production of liquid crystal devices. Thus, this content is not preferred. When the content is less than 3% by weight, liquid crystal molecules cannot be satisfactorily aligned. Thus, this content is not preferred.

The photopolymerizable resin material composition can contain at least one fluorinated acrylate compound. The composition can also contain two or more kinds of fluorinated acrylate compounds. In particular, when the fluorinated acrylate compound is a polyfunctional one substituted with fluorine in a predetermined range of fluorine substitution ratio, anchoring strength of liquid crystal molecules on polymer surfaces to be generated decreases and phase separation between the liquid crystal molecules and the polymer increases. Fluorinated acrylate compounds having a fluorine substitution ratio α of more than 0.8 are not preferred because the compatibility between the liquid crystal material and the other resin materials becomes extremely poor.

When the fluorinated acrylate compound is used as the acrylate compound, the content of the fluorinated acrylate compound in the photopolymerizable resin material composition is preferably in the range of 3% to 50% by weight based on the total weight of the composition. The content is more preferably in the range of 5% to 45% by weight. When the content is 50% by weight or more, the compatibility between the liquid crystal material and the other resin materials becomes extremely poor, which is not preferred. When the content is less than 3% by weight, the fluorinated resin material cannot exhibit its effect sufficiently, which is not preferred.

Furthermore, effects obtained when using, in particular, a fluorinated acrylate compound as the acrylate compound will be described below.

A liquid crystal apparatus produced utilizing polymerization and phase separation of a mixture containing a liquid crystal material and a polymerizable resin material has the following problems with respect to display characteristics.

TABLE 1

| Problems | Presumed reasons |
| --- | --- |
| Low response time | A resin material, a monomer, and the like are molten into liquid crystal. |
| Hysteresis | Anchoring strength of liquid crystal molecules on polymer walls is high. |
| High drive voltage | Anchoring strength of liquid crystal molecules on polymer walls is high. |
| Light leakage under the application of a saturated voltage | Liquid crystal molecules are molten into a polymer adhesion layer in liquid crystal regions. |

The points of the above-mentioned problems lie in high anchoring strength of the liquid crystal molecules on the polymer walls (surface) and compatibility between the polymer and the liquid crystal material (inner face). These problems can be solved by using a particular acrylate compound. In this case, it is preferable to fluorinate the photopolymerizable resin material or to add a perfluorochain to the material. Furthermore, such a fluorinated compound has different surface free energy from that of a polymer portion which is not fluorinated. Therefore, the fluorinated compound may appear on the surface of the polymer, resulting in a stabilized orientation state of liquid crystal.

The photopolymerizable resin material composition of the present invention can contain other photopolymerizable resin materials besides the above-mentioned acrylate compound. Examples of the other photopolymerizable resin materials include acrylic acid having an alkyl group or a benzene ring; monofunctional resin materials containing acrylic ester and methacrylic ester; acrylate or methacrylate having a polycylic aliphatic skeleton such as adamantyl for enhancing physical strength of a polymer; R-684 (produced by Nippon Kayaku Co., Ltd.), MPL-209S (produced by Nippon Kayaku Co., Ltd.), and polyfunctional resin materials having at least two functional groups such as bisphenol A dimethacrylate, bisphenol A diacrylate, 1,4-butanediol dimethacrylate, 1,6-hexanediol dimethacrylate, trimethylolpropane trimethacrylate, trimethylolpropane triacrylate, and tetramethylolmethane tetracrylate.

Physical strength and heat resistance of the polymer can be increased by introducing a polycyclic aliphatic skeleton into the polymer or increasing crosslinking density of the polymer, using the above-mentioned resin material.
(Photopolymerization delaying resin material)

The photopolymerization delaying resin material (polymerization suppressant) retards a photopolymerization speed to ensure satisfactory phase separation of the liquid crystal molecules and the polymer and to provide liquid crystal droplets corresponding to pixels. Here, the polymerization retarding resin material (polymerization suppressant) refers to a compound which is added to the polymerizable resin material to be used, thereby retarding the polymerization speed of the polymerizable resin material.

According to the present invention, when polymerization is slow, a phase separation speed of the liquid crystal and the polymer material decreases. Therefore, the liquid crystal droplets to be formed can be regulated so as to have approximately the same size to that of the pixel pattern. This results in enhanced contrast of the liquid crystal apparatus.

According to the present invention, as the photopolymerization delaying resin material, polymerizable compounds having lower polymerization reactivity than that of the above-mentioned acrylate or methacrylate compound are preferred. Examples of the—photopolymerization delaying resin material include derivatives having a resonance stability Q of a monomer in radical polymerization of 0.8 or more, such as styrene (Q=1), p-chlorostyrene (Q=1.03), and α-methylstyrene (Q=0.98). When the monomer having a larger resonance stability Q is used, radicals to be generated are more stabilized due to a resonance effect; as a result, a radical polymerization speed decreases.

The photopolymerization delaying resin material is preferably the compound represented by Formula VII.

In Formula VII, $X^3$ is hydrogen, a methyl group, or a phenyl group.

In Formula VII, $Z^2$ is hydrogen, an alkyl group substituted with fluorine, an alkyl group, an alkoxy group substituted with fluorine, an alkyl group substituted with phenyl, —$C(CH_3)_2$—NHCOOR— group (where R is an alkyl group, and an alkyl group substituted with fluorine),

—$C(CH_3)_2$—$NHCOOCH_2C(CH_3)_2CH_2OCONHC(CH_3)_2$—

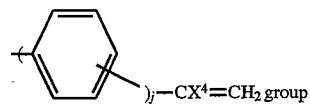
$)_j$—$CX^4$=$CH_2$ group or —$C(CH_3)_2NHCOOC_2H_4OCOCX^4$=$CH_2$ group (where $X^4$ is hydrogen or a methyl group, j is an integer of 1 or 2), and i is an integer of 1 or 2. An example of the alkyl group substituted with fluorine denoted by $Z^2$ is a $C_1$–$C_8$ alkyl group fully substituted with fluorine; an example of the alkyl group denoted by $Z^2$ is a $C_1$–$C_8$ alkyl group; an example the alkoxy group substituted with fluorine denoted by $Z^2$ is a $C_1$–$C_8$ alkoxy group fully substituted with fluorine; and an example of the alkyl group substituted with phenyl denoted by $Z^2$ is a $C_1$–$C_2$ alkyl group substituted with phenyl. An example of the alkyl group denoted by R in a —$C(CH_3)_2$—NHCOOR— group is a $C_1$–$C_8$ alkyl group; and an example of the alkyl group substituted with fluorine is a $C_1$–$C_8$ alkyl group fully substituted with fluorine.

In the preferred compound represented by Formula VII, $X^3$ is hydrogen or a methyl group, $Z^2$ is hydrogen or a —$C(CH_3)_2$—NHCOOR— group, and i is an integer of 1 or 2. More preferably, $X^3$ and $Z^2$ are hydrogen, and i is 1 or $X^3$ is a methyl group, $Z^2$ is a —$C(CH_3)_2$—NHCOOR— group, and i is 2. Still more preferably, $X^3$ is a methyl group, $Z^2$ is a —$C(CH_3)_2$—NHCOOR— group (R is an alkyl group) bound to p-position or m-position of a phenyl group, and i is 2. The alkyl group denoted by R is a $C_1$–$C_8$ alkyl group. Examples of the alkyl group include a methyl group, an isopropyl group, a chain alkyl group of 1 to 4 carbon atoms such as an n-butyl group, or a cyclic alkyl group of 5 to 8 carbon atoms such as cyclohexyl.

Examples of the Photopolymerization delaying resin material include 4-vinylbiphenyl, 4-butoxystyrene, 4-octyloxystyrene, 4-vinyl-4'-ethoxybiphenyl, 4-isopropylbiphenyl, 4-isopropenyl-4'-etoxybiphenyl, styrene derivatives such as α-methylstyrene dimer, diphenylethylene, and α-methylstyrene derivatives such as

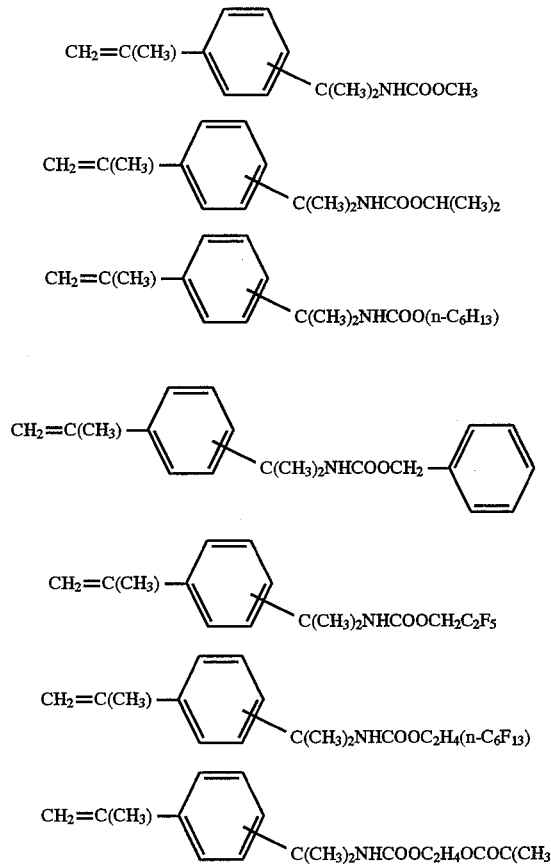

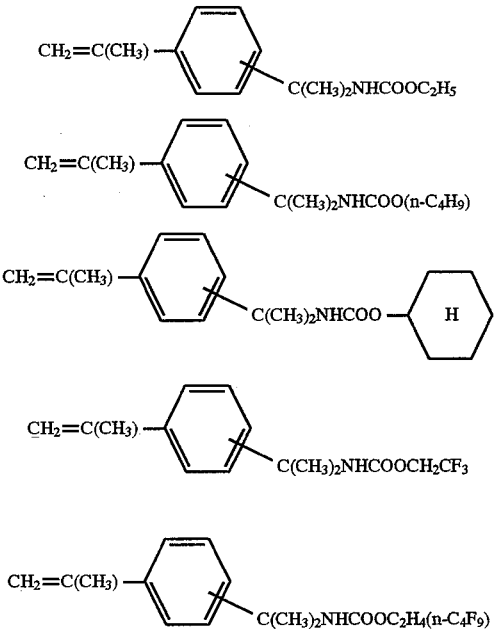

and

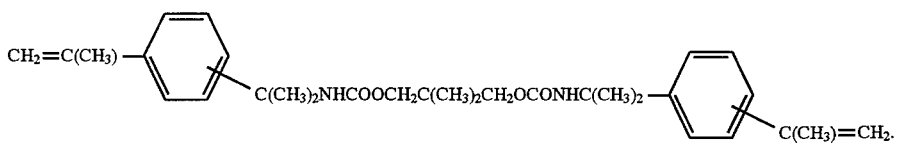

The above-mentioned α-methylstyrene derivative can be a p-substituent, o-substituent, or m-substituent. Alternatively, these substituents can be a mixture. In the styrene derivative and the α-methylstyrene derivative, carbon chain length of the benzene ring substituent decreases and physical strength of the polymer wall increases. Thus, as described in the following examples, the content of the photopolymerization delaying resin material in the composition can be adjusted by appropriately selecting the carbon chain length of the benzene ring substituent.

The content of the photopolymerization delaying resin material (polymerization suppressant) in the composition is not particularly limited because its retarding effect varies depending upon the material. However, the adding amount is preferably determined in such a manner that a peak value of a mixture containing a photocurable resin material, a photopolymerization initiator, and a photopolymerization delaying resin material is measured to be 60 seconds or less in a system with 3% photopolymerization initiator Irgacure 651 added at an irradiation strength of 10 mW/cm$^2$ (365 nm) and a reaction temperature of 30° C. to 60° C. by light differential thermal balance (Photo DSC, PDC121, manufactured by SEIKO electronics). When the peak value is 60 seconds or less, the liquid crystal droplets do not sufficiently grow. Therefore, the liquid crystal droplets to be obtained are not likely to reflect the pixel pattern and the polymer is formed partially in pixels, resulting in the decrease in contrast.

(Photopolymerization initiator)

The photopolymerizable resin material composition of the present invention can contain a photopolymerization initiator, if desired. As the photopolymerization initiator, Irgacure 651, Irgacure 184 (produced by CIBA-GEIGY Corporation), and Darocure 1137 (produce by Merck & Co., Inc.) can be used. The adding amount of the photopolymerization initiator is preferably in the range of 0.01% to 3% by weight based on the total weight of the liquid crystal material and the photopolymerizable resin material composition, if required. When the adding amount of the photopolymerization initiator is 3% by weight or more, a photopolymerization speed is too high to increase the size of the liquid crystal droplets, decreasing an electrical retention ratio required for TFT drive. When the adding amount of the photopolymerization initiator is 0.01% by weight or less, polymerization is not sufficiently effected, making it impossible to form polymer walls.

(Liquid crystal material)

Any material can be used as the liquid crystal material, as long as it is an organic mixture exhibiting a liquid crystalline state in the vicinity of room temperature. Examples of the preferred liquid crystal material include nematic liquid crystal (for dual frequency driving, including liquid crystal whose Δε<0), cholesteric liquid crystal (in particular, liquid crystal having selective reflection characteristics with respect to visible light), smectic liquid crystal, ferroelectric liquid crystal, discotic liquid crystal, and the like. Among these liquid crystals, nematic liquid crystal, cholesteric liquid crystal, or nematic liquid crystal with a chiral agent added is preferred because of their characteristics. In the nematic liquid crystal with a chiral agent added, considering the problem of coloring caused by hysteresis, uniformity, and d·Δn (phase difference), the chiral agent is preferably added so as to obtain a helical pitch of 10 μm or more. The liquid crystal material should have excellent resistance against chemical reactions, since a photopolymerization reaction is effected during the production of the liquid crystal display device. Examples of such liquid crystal materials include those having a functional group such as fluorine atoms in the compounds. More specifically, ZLI-4801-000, ZLI-4801-001, and ZLI-4792 (produced by Merck & Co., Inc.) can be used. These liquid crystal material can be used in combination.

The mixing ratio between the liquid crystal material and the photopolymerizable resin material composition is preferably in the range of 60:40 to 95:5 by weight. When the mixing ratio is more than 60:40, the liquid crystal regions which change with respect to an electrode voltage of the liquid crystal device decreases, resulting in poor contrast. When the mixing ratio is more than 95:5, it becomes difficult for the polymer walls to be sufficiently formed. Furthermore, as the $T_{NI}$ point of the mixture of the liquid crystal material and the photopolymerizable resin material composition increases, it becomes difficult to inject the mixture in vacuo.

(Dichroic dye)

The photopolymerizable resin material composition of the present invention can contain a dichroic dye if necessary.

In the case where a dichroic dye is used along with the liquid crystal material, the orientation direction of the dye molecules changes according to the orientation direction of the liquid crystal molecules, thereby varying the absorption rate of light which is transmitted through the liquid crystal layer. A so-called guest-host display mode of a liquid crystal display device is a display method which utilizes the change in the absorption rate of light transmitted through a liquid crystal layer induced by a dichroic dye. This display mode is applicable to the liquid crystal display device of the present invention.

A dichroic dye to be used for a guest-host display mode must at least have the following properties:

(1) it can dissolve into the host, i.e., a liquid crystal, to an extent where a sufficient optical density is provided;

(2) it has a large dichroic ratio (which will contribute to the display contrast); and (3) it is chemically stable, e.g., in terms of resistance to light, inability to hinder radical polymerization, and so on.

Examples of dyes which have the above properties include anthraquinone-type dyes. Other examples include dichroic dyes such as azo-type dyes and benzoquinone-type dyes.

Preferably, a dichroic dye is to be used in an amount of 0.05% to 10%, and more preferably 0.1% to 5%, by weight based on the total weight of the host liquid crystal according to the present invention. If the amount of dichroic dye exceeds the above range, the dichroic dye will not sufficiently dissolve into the host liquid crystal and will also reduce the amount of light transmitted through the liquid crystal, thereby decreasing the transmittance of the panel.

(Method for producing a preferred liquid crystal display device)

First, a liquid crystal cell including transparent electrodes of ITO (a composite of indium tin oxide and tin oxide) (thickness: 50 nm) is produced. A photomask of a predetermined configuration is placed on the liquid crystal cell. A homogenous mixture of the photopolymerizable resin material composition of the present invention and a liquid crystal material is injected into the cell through capillary action. Thereafter, UV-rays (ultraviolet rays) are radiated through the photomask by using a high-pressure mercury lamp capable of providing collimated light, while applying a voltage between the transparent electrodes, so as to cure the resin. Thus, a liquid crystal display device is obtained.

Under certain conditions, a liquid crystal device obtained by using the photopolymerizable resin material composition of the present invention in the above-mentioned manner may have the following problems: 1) the polarizing plate may have some viewing angle characteristics because the liquid crystal molecules stand substantially perpendicularly with respect to the substrate surface when a saturation voltage is applied (i.e., in the case where $\Delta\epsilon>0$); and 2) it may have a region in which the viewing angle characteristics when viewed at an angle of 45° with respect to the polarization axis of the polarizing plate are not sufficient because the liquid crystal layer has d·$\Delta$n.

The reason for 2) above is as follows: Whereas light incident along the axis direction can only have a normal light component or an abnormal light component when traversing the refractive ellipsoid of the liquid crystal layer, light incident at an angle of 45° with the polarization axis of the polarizing plate has both a ordinary light component and an extraordinary light component when traversing the refractive ellipsoid of the liquid crystal layer (as if in the case where light is incident in a direction which is not parallel to either of the polarization axes of two polarizing plates disposed perpendicularly to each other), thus resulting in elliptic polarization which makes leakage of light conspicuous. Therefore, it is preferable to minimize the retardation of the liquid crystal layer so as to prevent elliptic polarization. However, since the retardation of the liquid crystal layer influences the transmittance $T_0$ under a condition where no voltage is applied, it is preferable that the retardation of the liquid crystal layer is in the range of 300 nm to 650 nm in order to secure ominidirectional viewing characteristics and cell brightness. (When the retardation of the liquid crystal layer is 300 nm or less, sufficient brightness cannot be provided when the device is in an OFF state, so that a dark display results.) The twist angle is preferably in the range of 45° to 150°, and most preferably in the vicinity of 90°, at which the first minimum condition is satisfied and the display becomes the brightest.

By composing a liquid crystal device using the photopolymerizable resin material composition of the present invention, it becomes easy to sufficiently align liquid crystal molecules. However, various orientation methods can be used in addition to further control the orientation of the liquid crystal molecules. Orientation methods applicable to the present invention include: a rubbing method (in which a polymer material such as polyimide or an inorganic material is applied to a substrate of a liquid crystal cell and thereafter the substrate is rubbed with cloth), a vertical orientation method (in which a compound having a low surface tension is applied on a surface of a substrate), an oblique orientation method (in which $SiO_2$ or the like is obliquely vapor-deposited). It is also applicable to employ a horizontal alignment film (for which no rubbing treatment has been performed) or a non-treated substrate (i.e., a substrate simply provided with transparent electrodes).

In the case where a conventional liquid crystal orientation technique, e.g., rubbing, obliquely vapor-deposited $SiO_2$, etc., is applied to a liquid crystal device produced according to the above-described production method, a liquid crystal device of a configuration in which a conventional orientation-controlled display device having a high contrast and steep driving voltage characteristics (e.g., TN, STN, ECB, and ferroelectric liquid crystal devices) is pseudo-solidified within a polymer can be produced by interposing the present liquid crystal device with a pair of polarizing plates.

A liquid crystal device produced according to the above-described production method, or a liquid crystal device obtained by interposing the liquid crystal device between a pair of polarizing plates can be driven by various driving methods, such as a simple matrix driving method and an active matrix driving method using a-Si TFTs, p-Si TFTs, MIMs, etc. However, the present invention provides no limitation as to the kind of driving method to be used.

EXAMPLES

Hereinafter, the present invention will be described by way of illustrative examples; however, the present invention is not limited thereto. Unless otherwise specified, "parts" refer to "parts by weight".

(Synthesis of an acrylate compound used in the present invention)

(Synthesis Example 1) Synthesis of a monofunctional acrylate compound MPL-209S

First, 152 parts of tricyclodecanol represented by the following Formula:

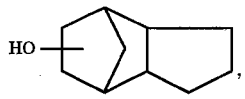

86.5 parts of acrylic acid, 0.7 parts of hydroquinone, 60 parts of toluene, 60 parts of cyclohexane, and 2 parts of sulfuric acid were placed in a reactor equipped with a stirrer, a water separator, and a thermometer. The mixture was heated and allowed to react for 8 hours while water was being removed from the system by azeotropy. The reaction temperature was in the range of 90° C. to 98° C., and there was 18 parts of generated water. The reaction solution thus obtained was dissolved into 500 parts of toluene, and the resultant solution was washed three times with a 10% aqueous solution of sodium hydroxide and three times with 20% brine. Thereafter, toluene and cyclohexane were distilled under reduced pressure to obtain 122 parts of a pale yellow liquid. The pale yellow liquid was dissolved into 500 parts of toluene, allowed to flow through 120 parts of silica gel for column chromatography, and further subjected to an elution with 2000 parts of toluene. Toluene was distilled by blowing a small amount of air into the resultant eluate under reduced pressure, whereby a purified product was obtained. The purified product thus obtained had a viscosity of 13 cps (25° C.) and a refractive index of 1.498 (25° C.). The purified product is represented by the following formula:

CH₂=CHCOO 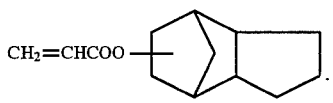

(Synthesis Example 2) Synthesis of a bifunctional acrylate compound KSM-015

First, 290 parts of 3,3,4,4,5,5,6,6-octafluorooctane-1,8-diol, 173 parts of acrylic acid, 1.3 parts of hydroquinone, 250 parts of toluene, and 5 parts of sulfuric acid were placed in a reactor equipped with a stirrer, a water separator, and a thermometer. The mixture was heated and allowed to react for 8 hours while water was being removed from the system by azeotropy. The reaction temperature was in the range of 100° C. to 111° C., and there was 36 parts of generated water. The reaction solution thus obtained was dissolved into 1000 parts of toluene, and the resultant solution was washed three times with a 10% aqueous solution of sodium hydroxide and three times with 20% brine. Thereafter, toluene and cyclohexane were distilled under reduced pressure to obtain 295 parts of a pale yellow liquid. The pale yellow liquid was dissolved into 1000 parts of toluene, allowed to flow through 300 parts of silica gel for column chromatography, and further subjected to an elution with 4000 parts of toluene. Toluene was distilled by blowing a small amount of air into the resultant eluate under reduced pressure, whereby a purified product was obtained. The purified product thus obtained had a viscosity of 31 cps (25° C.) and a refractive index of 1.407 (25° C.). The purified product is represented by the following formula:

$$CH_2=CHCOOCH_2CH_2(CF_2)_4CH_2CH_2OCOCH=CH_2$$

(Synthesis Example 3) Synthesis of a bifunctional acrylate compound KSM-016

First, 376 parts of 3-(perfluoro-n-hexyl)propenoxide, 86.5 parts of acrylic acid, 2.3 parts of tetramethylammonium chloride, and 0.23 parts of hydroquinone monomethylether were placed in a reactor equipped with a stirrer, a water separator, and a thermometer. The mixture was heated and allowed to react for 15 hours at a temperature in the range of 90° C. to 95° C. Next, 500 parts of toluene, 86.5 parts of acrylic acid, 16.5 parts of sulfuric acid, and 5.5 parts of hydroquinone were added to the mixture. The resultant mixture was again heated and allowed to react for 15 hours while water was being removed from the system by azeotropy. The reaction temperature was in the range of 107° C. to 113° C., and there was 12.3 parts of generated water. The reaction solution thus obtained was dissolved into 1000 parts of toluene, and the resultant solution was washed three times with a 10% aqueous solution of sodium hydroxide and three times with 20% brine. Thereafter, toluene was distilled under reduced pressure to obtain 477 parts of a pale yellow liquid. The pale yellow liquid was dissolved into 1000 parts of toluene, allowed to flow through 500 parts of silica gel for column chromatography, and further subjected to an elution with 4000 parts of toluene. Toluene was distilled by blowing a small amount of air into the resultant eluate under reduced pressure, whereby a purified product was obtained. The purified product thus obtained had a viscosity of 400 cps (25° C.) and a refractive index of 1.3817 (25° C.). The purified product is represented by the following formula:

$$CF_3(CF_2)_5CH_2CHCH_2OCOCH=CH_2$$
$$\quad\quad\quad\quad\quad\;|$$
$$\quad\quad\quad\quad\quad OCOCH=CH_2$$

(Synthesis Example 4) Synthesis of a photopolymerization delaying resin material TMI-04

First, 201 parts of 3-isopropenyl-α,α-dimethylbenzilisocyanate, 148 parts of n-butyl alcohol, and 0.13 parts of hydroquinone monomethylether were mixed in a reactor equipped with a stirrer, a water separator, and a thermometer. The mixture was allowed to react for 20 hours at 80° C. while being stirred, with a small amount of air being blown into the mixture. Next, 0.03 parts of dilaurylate di-n-butyl tin was added to the mixture, and the reaction was continued for another 3 hours. There was 0.1% of remaining isocyanate. After the reaction was terminated, the redundant n-butyl alcohol was distilled under reduced pressure to obtain 275 parts of a pale yellow liquid. The pale yellow liquid was dissolved into 900 parts of toluene, allowed to flow through 300 parts of silica gel for column chromatography, and further subjected to an elution with 3600 parts of toluene. Toluene was distilled by blowing a small amount of air into the resultant eluate under reduced pressure, whereby a purified product was obtained. The purified product thus obtained had a viscosity of 160 cps (25° C.), a refractive index of 1.47 (25° C.), and a specific gravity of 1.010 (25° C.). The purified product is represented by the following formula:

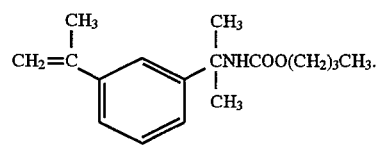

(Synthesis Example 5) Synthesis of a bifunctional acrylate compound KSM-018

First, 376 parts of 3-(perfluoro-n-hexyl)propenoxide, 86.5 parts of acrylic acid, 2.3 parts of tetramethylammonium chloride, and 0.23 parts of hydroquinone monomethylether were placed in a reactor equipped with a stirrer, a water separator, and a thermometer. The mixture was heated and allowed to react for 15 hours at a temperature in the range of 90° C. to 95° C. The reaction solution thus obtained was dissolved into 1000 parts of toluene, and the resultant solution was washed three times with a 10% aqueous solution of sodium hydroxide and three times with 20% brine. Thereafter, toluene was distilled under reduced pressure to obtain 425 parts of a pale yellow liquid. This product is a mixture of two acrylic acid esters represented by the respective formulae:

$$CF_3(CF_2)_5CH_2CH(OH)CH_2OCOCO=CH_2$$

$$CF_3(CF_2)_5CH_2CH(CH_2OH)OCOCO=CH_2$$

Next, 37.8 parts of hexamethylenediisocyanate, 0.13 parts of hydroquinone monomethylether, and 0.13 parts of dilaurylate di-n-butyl tin were added to 224 parts of the mixture of acrylic acid esters thus obtained. The resultant mixture was allowed to react at a temperature in the range of 35° C. to 40° C. until there was 0.1% or less of remaining isocyanate, whereby 262 parts of a pale yellow liquid was obtained. This reaction product was dissolved into 500 parts of toluene, allowed to flow through 250 parts of silica gel for column chromatography, and further subjected to an elution with 2000 parts of toluene. Toluene was distilled by blowing a small amount of air into the resultant eluate under reduced pressure, whereby a purified product was obtained. The purified product thus obtained had a viscosity of 104 cps (25° C.) and a refractive index of 1.392 (25° C.). The purified product is a mixture of three compounds represented by the respective formulae:

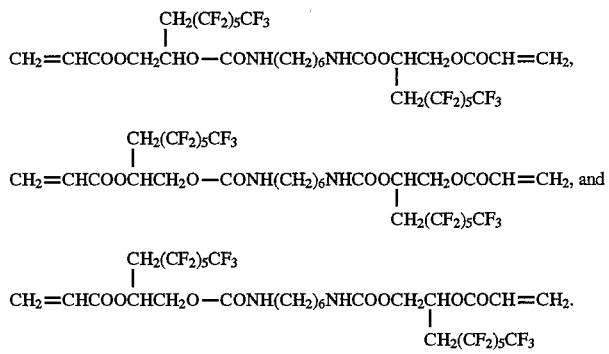

(Synthesis Example 6) Synthesis of a photopolymerization delaying resin material TMI-21

First, 201 parts of 3-isopropenyl-α,α-dimethylbenzilisocyanate, 180 parts of 2,2,3,3,3-pentafluoropropanol, and 0.13 parts of hydroquinone monomethylether were mixed in a reactor equipped with a stirrer, a water separator, and a thermometer. The mixture was allowed to react for 60 hours at 80° C. while being stirred, with a small amount of air being blown into the mixture. Next, 0.03 parts of dilaurylate di-n-butyl tin was added to the mixture, and the reaction was continued for another 3 hours. There was 0.1% of remaining isocyanate. After the reaction was terminated, the redundant alcohol was distilled under reduced pressure to obtain 351 parts of a pale yellow liquid. The pale yellow liquid was dissolved into 1000 parts of toluene, allowed to flow through 350 parts of silica gel for column chromatography, and further subjected to an elution with 4000 parts of toluene. Toluene was distilled by blowing a small amount of air into the resultant eluate under reduced pressure, whereby a purified product was obtained. The purified product thus obtained had a refractive index of 1.47 (25° C.). The purified product is represented by the following formula:

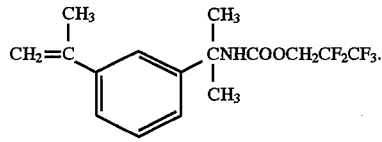

(Synthesis Example 7) Synthesis of a bifunctional acrylate compound KSM-051

First, 390 parts of 3,3,4,4,5,5,6,6,7,7,8,8-dodecafluorododecane-1,10-diol, 173 parts of acrylic acid, 1.3 parts of hydroquinone, 250 parts of toluene, and 5 parts of sulfuric acid were placed in a reactor equipped with a stirrer, a water separator, and a thermometer. The mixture was heated and allowed to react for 8 hours while water was being removed from the system by azeotropy. The reaction temperature was in the range of 100° C. to 113° C., and there was 36 parts of generated water. The reaction solution thus obtained was dissolved into 1000 parts of toluene, and the resultant solution was washed three times with a 10% aqueous solution of sodium hydroxide and three times with 20% brine. Thereafter, toluene was distilled under reduced pressure to obtain 400 parts of a pale yellow liquid. The pale yellow liquid was dissolved into 1300 parts of toluene, allowed to flow through 400 parts of silica gel for column chromatography, and further subjected to an elution with 5000 parts of toluene. Toluene was distilled by blowing a small amount of air into the resultant eluate under reduced pressure, whereby a purified product was obtained. The purified product thus obtained had a viscosity of 30 cps (25° C.) and a refractive index of 1.390 (25° C.). The purified product is represented by the following formula:

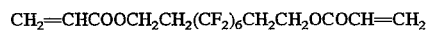

(Synthesis Example 8) Synthesis of a bifunctional acrylate compound KSM-053

First, 134 parts of trimethylolpropane, 414 parts of perfluorooctanic acid, 200 parts of toluene, 200 parts of cyclohexane, and 10 parts of conc. sulfuric acid were placed in a reactor equipped with a stirrer, a water separator, and a thermometer. The mixture was heated and allowed to react for 8 hours while water was being removed from the system by azeotropy. The reaction temperature was in the range of 87° C. to 95° C., and there was 18 parts of generated water. After the reaction solution was cooled, 173 parts of acrylic acid and 1.3 parts of hydroquinone were added to the mixture. The resultant mixture was again heated and allowed to react for 8 hours while water was being removed from the system by azeotropy. The reaction temperature was in the range of 87° C. to 95° C., and there was 36 parts of generated water. After the reaction solution was cooled, 600 parts of toluene was added to the reaction solution, and the reaction solution was subjected to a neutralization washing with 100 parts of a 25% aqueous solution of sodium hydroxide and was washed three times with 100 parts of 20% brine. Thereafter, toluene was distilled under reduced pressure to obtain 574 parts of a pale yellow liquid. The pale yellow liquid was dissolved into 1000 parts of toluene, allowed to flow through 600 parts of silica gel for column chromatography, and further subjected to an elution with 5000 parts of toluene. Toluene was distilled by blowing a small amount of air into the resultant eluate under reduced pressure, whereby a purified product was obtained. The purified product thus obtained had a viscosity of 220 cps (25° C.), a refractive index of 1.409 (25° C.), and a specific gravity of 1.377 (25° C.). The purified product is represented by the following formula:

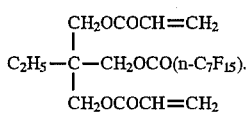

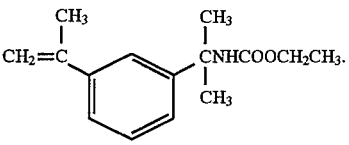

(Synthesis Example 9) Synthesis of a photopolymerization delaying resin material TMI-01

First, 201 parts of 3-isopropenyl-α,α-dimethylbenzilisocyanate, 100 parts of methylalcohol, and 0.13 parts of hydroquinone monomethylether were mixed in a reactor equipped with a stirrer, a water separator, and a thermometer. The mixture was allowed to react for 30 hours under reflux, with a small amount of air being blown into the mixture. Next, 0.03 parts of dilaurylate di-n-butyl tin was added to the mixture, and the reaction was continued for another 3 hours. There was 0.1% of remaining isocyanate. After the reaction was terminated, the redundant alcohol was distilled under reduced pressure to obtain 230 parts of a pale yellow liquid. The pale yellow liquid was dissolved into 900 parts of toluene, allowed to flow through 300 parts of silica gel for column chromatography, and further subjected to an elution with 3600 parts of toluene. Toluene was distilled by blowing a small amount of air into the resultant eluate under reduced pressure, whereby a purified product was obtained. The purified product thus obtained had a viscosity of 248 dps (25° C.), a refractive index of 1.534 (25° C.), and a specific gravity of 1.053 (25° C.). The purified product is represented by the following formula:

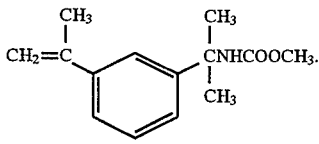

(Synthesis Example 10) Synthesis of a photopolymerization delaying resin material TMI-02

First, 201 parts of 3-isopropenyl-α,α-dimethylbenzilisocyanate, 100 parts of ethylalcohol, and 0.13 parts of hydroquinone monomethylether were mixed in a reactor equipped with a stirrer, a water separator, and a thermometer. The mixture was allowed to react for 20 hours under reflux, with a small amount of air being blown into the mixture. Next, 0.03 parts of dilaurylate di-n-butyl tin was added to the mixture, and the reaction was continued for another 3 hours. There was 0.1% of remaining isocyanate. After the reaction was terminated, the redundant alcohol was distilled under reduced pressure to obtain 247 parts of a pale yellow liquid. The pale yellow liquid was dissolved into 900 parts of toluene, allowed to flow through 300 parts of silica gel for column chromatography, and further subjected to an elution with 3600 parts of toluene. Toluene was distilled by blowing a small amount of air into the resultant eluate under reduced pressure, whereby a purified product was obtained. The purified product thus obtained had a viscosity of 282 cps (25° C.), a refractive index of 1.526 (25° C.), and a specific gravity of 1.035 (25° C.). The purified product is represented by the following formula:

(Synthesis Example 11) Synthesis of a photopolymerization delaying resin material TMI-03

First, 201 parts of 3-isopropenyl-α,α-dimethylbenzilisocyanate, 120 parts of i-propyl alcohol, and 0.13 parts of hydroquinone monomethylether were mixed in a reactor equipped with a stirrer, a water separator, and a thermometer. The mixture was allowed to react for 20 hours under reflux, with a small amount of air being blown into the mixture. Next, 0.03 parts of dilaurylate di-n-butyl tin was added to the mixture, and the reaction was continued for another 3 hours. There was 0.1% of remaining isocyanate. After the reaction was terminated, the redundant i-propyl alcohol was distilled under reduced pressure to obtain 261 parts of a pale yellow liquid. The pale yellow liquid was dissolved into 900 parts of toluene, allowed to flow through 300 parts of silica gel for column chromatography, and further subjected to an elution with 3600 parts of toluene. Toluene was distilled by blowing a small amount of air into the resultant eluate under reduced pressure, whereby a purified product was obtained. The purified product thus obtained had a viscosity of 360 cps (25° C.), a refractive index of 1.517 (25° C.), and a specific gravity of 1.010 (25° C.). The purified product is represented by the following formula:

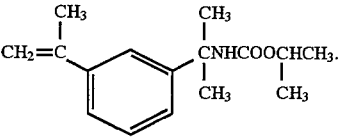

(Example 1)

Figure 3:
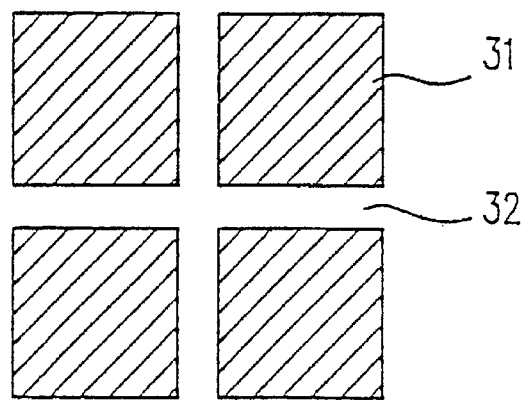
FIG. 3 is a view showing a photomask used in Example 1.
Figure 4:
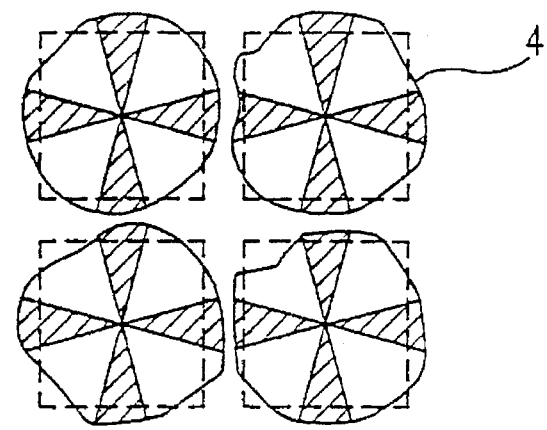
FIG. 4 is a view of liquid crystal regions of a liquid crystal cell of Example 1 observed with a polarizing microscope.
Figure 4:
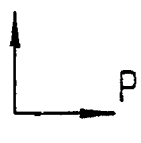

A liquid crystal cell was constructed by using two glass substrates (thickness: 1.1 mm) having transparent electrodes of ITO (thickness: 50 nm) formed thereon and spacers (height: 5 μm) for securing a cell thickness. A photomask having shading portions 31 and light transmitting portions 32 as shown in FIG. 3 was placed on the cell thus fabricated. Furthermore, a mixture was prepared by homogeneously mixing the following substances: a photopolymerizable resin material consisting of 0.225 g of a monofunctional acrylate compound MPL-209S (manufactured by Nippon Kayaku K.K.) and 0.15 g of lauryl acrylate; 0.225 g of a bifunctional acrylate compound KSM-015 (manufactured by Nippon Kayaku K.K.; α=0.5), which is a component of the photopolymerizable resin material composition of the present invention; a photopolymerization delaying resin material consisting of 0.15 g of t-butoxy styrene, which is also a component of the photopolymerizable resin material composition of the present invention; a liquid crystal material consisting of 4.3 g of ZLI-4792 (manufactured by Merck & Co., Inc.; Δn=0.094), to which a chiral agent S-811 was added in an amount of 0.3%; and a photopolymerization initiator consisting of 0.03 g of Irgacure 651 (manufactured by CIBA-GEIGY Corporation). After the homogenous mixture was injected into the cell through capillary action, the cell was irradiated with UV-rays (100° C., 8 minutes)

through the photomask under a high-pressure mercury lamp (capable of providing collimated light) where a power of 10 mW/cm$^2$ was obtained, while a voltage of ±2.5 V was applied between the transparent electrodes. Thus, the UV-rays were radiated onto the cell in a pattern having a spatial regularity. Thereafter, while continuing the application of the voltage, the cell was gradually (at a rate of 10° C./hr) cooled to 25° C. (where liquid crystal takes a nematic state), and the cell was further irradiated with UV-rays for 3 consecutive minutes so as to cure the resin.

The cell thus produced was observed with a polarizing microscope. The observation revealed that liquid crystal regions 4 were formed which substantially reflect the configuration of the photomask, and that an orientation was formed which was axially symmetrical with respect to a central axis.

Next, polarizing plate were attached on both side of the liquid crystal cell thus produced in such a manner that the polarizing plates were in a crossed-Nicol state. Thus, a liquid crystal device was produced.

The electrooptical characteristics of the liquid crystal device were evaluated by measuring the voltage-transmittance characteristics and the response time of the liquid crystal device by using a liquid crystal characteristics evaluation system LCD-5000 (manufactured by Otsuka electronics) and a reference cell obtained by disposing a polarizing plate on either side of the above-mentioned two glass substrates attached to each other in a parallel-Nicol state. Herein, the response time is defined as a sum τr+τd (ms) of a rise response time τr (ms) and a delay response time τd (ms). The rise response time τr is defined as a time amount required for the light transmittance to vary by 90% from an initial transmittance when a voltage of 10 V was applied. The fall response time τd is defined as a time amount required for the light transmittance to vary by 90% from a transmittance corresponding to a state of displaying a black image after the application of a voltage was stopped. The measurement results of such electrooptical characteristics are shown in FIG. 5A–5F and Table 2 discussed in detail below.

(Example 2)

A mixture was prepared by homogeneously mixing the following substances: a photopolymerizable resin material consisting of 0.225 g of a monofunctional acrylate compound MPL-209S (manufactured by Nippon Kayaku K.K.) and 0.15 g of lauryl acrylate; 0.225 g of a bifunctional acrylate compound KSM-016 (manufactured by Nippon Kayaku K.K.; α=0.72), which is a component of the photopolymerizable resin material composition of the present invention; a photopolymerization delaying resin material consisting of 0.15 g of TMI-04 (manufactured by Nippon Kayaku K.K.), which is also a component of the photopolymerizable resin material composition of the present invention; a liquid crystal material consisting of 4.3 g of ZLI-4792 (manufactured by Merck & Co., Inc.; Δn=0.094), to which a chiral agent S-811 was added in an amount of 0.3%; and a photopolymerization initiator consisting of 0.03 g of Irgacure 651. After the homogenous mixture was injected into the cell through capillary action, the cell was exposed to UV-rays through a photomask while a voltage was applied in accordance with Example 1 so as to effect a photopolymerization-induced phase separation.

Next, a polarizing plates was attached on either side of the liquid crystal cell thus produced in such a manner that the polarizing plates were in a crossed-Nicol state. The electrooptical characteristics of the resultant liquid crystal device were evaluated as in Example 1. The measurement results thereof are shown in Table 2.

(Example 3)

Figure 6A:
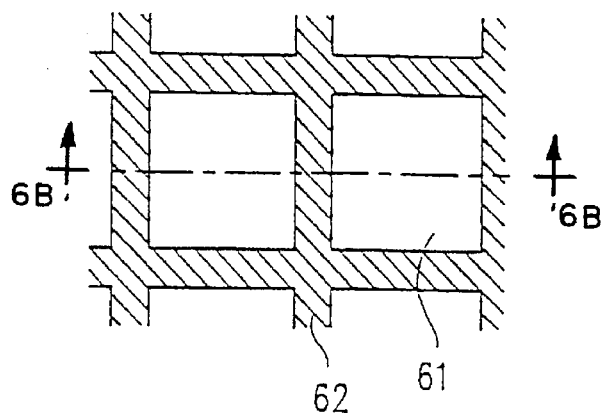
FIG. 6A is a schematic view showing a structure of a liquid crystal cell produced in Example 3 and FIG. 6B is a cross-sectional view of the cell shown in FIG. 6A.
Figure 6B:
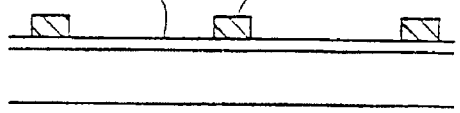

A glass substrate (thickness: 1.1 mm) having transparent electrodes of ITO (thickness: 50 nm) formed thereon was subjected to predetermined steps including resist application, sintering, exposure to light using the photomask shown in FIG. 3, development, rinsing, and further sintering. Thereafter, as shown in FIGS. 6A and 6B, a resist material (OMR83: manufactured by Tokyo Oka) was applied as an insulation material so as to form a pattern 62 on the ITO 61. Thus, a first substrate was obtained. On the other hand, polyimide AL4552 (manufactured by Nippon Synthetic Rubber) was applied on another glass substrate so as to form an insulation film thereon. No rubbing was performed for the insulation film. Thus, a second substrate (unrubbed) was obtained. A cell was constructed by using the first and second substrates and spacers (height: 5 μm) for securing a cell thickness.

A mixture was prepared by homogeneously mixing the following substances: a photopolymerizable resin material consisting of 0.225 g of a monofunctional acrylate compound MPL-209S (manufactured by Nippon Kayaku K.K.) and 0.15 g of lauryl acrylate; 0.225 g of a bifunctional acrylate compound KSM-018 (manufactured by Nippon Kayaku K.K.; α=0.54), which is a component of the photopolymerizable resin material composition of the present invention; a photopolymerization delaying resin material consisting of 0.15 g of TMI-04 (manufactured by Nippon Kayaku K.K.), which is also a component of the photopolymerizable resin material composition of the present invention; a liquid crystal material consisting of 4.3 g of ZLI-4792 (manufactured by Merck & Co., Inc.; Δn=0.094), to which a chiral agent S-811 was added in an amount of 0.3%; and a photopolymerization initiator consisting of 0.03 g of Irgacure 651. The homogenous mixture was vacuum-injected into the cell under reduced pressure. Thereafter, while maintaining the temperature of the substrate at 110° C. and applying an effective voltage of 2.5 V (60 Hz) between the transparent electrodes, the cell was irradiated with UV-rays for 5 minutes through the first substrate under a high-pressure mercury lamp where a power of 10 mW/cm$^2$ was obtained, so as to cure the resin material. Thereafter, the cell was gradually cooled to 40° C. over 5 hours (while continuing the application of the voltage), further cooled to room temperature (i.e., 25° C.), and was subjected to further irradiation by using the same UV-ray radiation device so as to complete the curing of the resin material.

Figure 7:
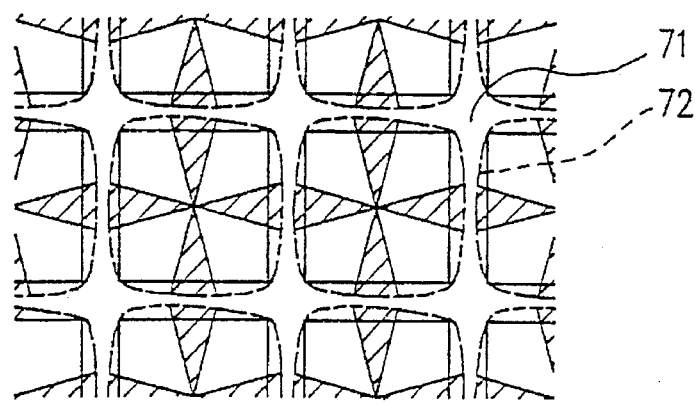
FIG. 7 is a view showing an orientation state of liquid crystal regions of a liquid crystal cell produced in Example 3.

The liquid crystal cell thus fabricated was observed with a polarizing microscope. The observation showed that, as shown in FIG. 7, polymer was formed in regions outside the pixels, i.e., resist portions 71 (where the resist was patterned out) and that liquid crystal regions 72 were formed in regions corresponding to the ITO, the liquid crystal molecules being oriented in an axially symmetrical manner in a mono-domain state in each partition. The proof for this was that, when two polarizing plates were attached onto the cell in a crossed-Nicol state and the resultant liquid crystal cell was rotated, only the polymer walls surrounding the liquid crystal regions were observed to be rotating while the position of the schlieren pattern of the liquid crystal regions seemed stationary.

Next, polarizing plates were attached on both side of the liquid crystal cell thus produced in such a manner that the polarizing plates were in a crossed-Nicol state. Thus, a liquid crystal device having liquid crystal regions surrounded by polymer walls was obtained. The electrooptical characteristics of the resultant liquid crystal device were evaluated as in Example 1. The measurement results thereof are shown in Table 2. This liquid crystal device did not exhibit any inversion of images, which is typically observed of a TN liquid crystal display device (Comparative Example 1; to be described later), or any increase in transmittance at the higher viewing angles when a saturation voltage was applied. Moreover, no roughness was observed in intermediate gray scale tones.

(Example 4)

A mixture was prepared by homogeneously mixing the following substances: a photopolymerizable resin material consisting of 0.15 g of a monofunctional acrylate compound MPL-209S (manufactured by Nippon Kayaku K.K.) and 0.225 g of lauryl acrylate; 0.225 g of a mixture ($\alpha=0$) of a bifunctional acrylate compound represented by the following formula:

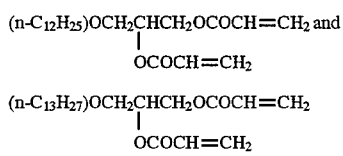

which is a component of the photopolymerizable resin material composition of the present invention; a 0.15 g of a photopolymerization delaying resin material represented by the following formula:

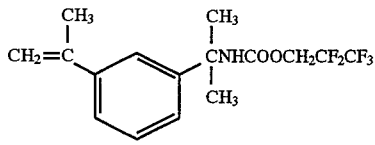

which is also a component of the photopolymerizable resin material composition of the present invention; a liquid crystal material consisting of 4.3 g of ZLI-4792 (manufactured by Merck & Co., Inc.; $\Delta n=0.094$), to which a chiral agent S-811 was added in an amount of 0.3%; and a photopolymerization initiator consisting of 0.03 g of Irgacure 651. The homogenous mixture was vacuum-injected into the cell under reduced pressure. Thereafter, while maintaining the temperature of the substrate at 110° C. and applying an effective voltage of 2.5 V (60 Hz) between the transparent electrodes, the cell was irradiated with UV-rays for 5 minutes through the first substrate under a high-pressure mercury lamp where a power of 10 mW/cm² was obtained, so as to cure the resin material. Thereafter, the cell was gradually cooled to 40° C. over 5 hours (while continuing the application of the voltage), further cooled to room temperature (i.e., 25° C.), and was subjected to further irradiation by using the same UV-ray irradiation device so as to complete the curing of the resin material.

The liquid crystal cell thus fabricated was observed with a polarizing microscope. The observation showed that, as in Example 3, liquid crystal molecules were oriented in an axially symmetrical manner in a mono-domain state.

Next, a polarizing plates was attached on either side of the liquid crystal cell thus produced in such a manner that the polarizing plates were in a crossed-Nicol state. Thus, a liquid crystal device having liquid crystal regions surrounded by polymer walls was obtained. The electrooptical characteristics of the resultant liquid crystal device were evaluated as in Example 1. The measurement results thereof are shown in Table 2.

(Comparative Example 1)

Polyimide AL4552 was applied onto glass substrates provided with ITO similar to those used in Example 1. The substrates were subjected to a rubbing treatment and were attached to each other in such a manner that the orientation directions were perpendicular to each other. A liquid crystal material ZLI-4792 (containing 0.3% by weight of S-811) was injected into the cell, and a polarizing plates was attached on either side of the resultant liquid crystal cell in such a manner that the polarizing plates were in a crossed-Nicol state. Thus, a conventional TN-mode liquid crystal display device was produced. The electrooptical characteristics of the liquid crystal device are shown in Table 2. The viewing angle dependence of the electrooptical characteristics is shown in FIG. 8.

(Comparative Example 2)

A mixture was prepared by homogeneously mixing the following substances: a photopolymerizable resin material consisting of 0.225 g of a monofunctional acrylate compound MPL-209S (manufactured by Nippon Kayaku K.K.) and 0.15 g of lauryl acrylate; 0.225 g of a bifunctional resin NPGDA (manufactured by Nippon Kayaku K.K.; $\alpha=0$), a photopolymerization delaying resin material consisting of 0.15 g of p-phenylstyrene; a liquid crystal material consisting of 4.3 g of ZLI-4792 (manufactured by Merck & Co., Inc.; $\Delta n =0.094$), to which a chiral agent S-811 was added in an amount of 0.3%; and a photopolymerization initiator consisting of 0.03 g of Irgacure 651. After the homogenous mixture was injected into a cell produced in accordance with Example 1 through capillary action, the cell was exposed to UV-rays through a photomask while a voltage was applied in accordance with Example 1 so as to effect a photopolymerization-induced phase separation.

Next, a polarizing plates was attached on either side of the liquid crystal cell thus produced in such a manner that the polarizing plates were in a crossed-Nicol state. The electrooptical characteristics of the resultant liquid crystal device were evaluated as in Example 1. The measurement results thereof are shown in Table 2.

In the liquid crystal cell of Comparative Example 2, the phase separation between liquid crystal and polymer was insufficient, and a large amount of the resin material was present within the liquid crystal regions. Thus, the liquid crystal cell of Comparative Example 2 did not attain sufficient display characteristics.

TABLE 2

| | Ex. 1 | Ex. 2 | Ex. 3 | Ex. 4 | Comp. Ex.1 | Comp. Ex.2 |
|---|---|---|---|---|---|---|
| Light transmittance (%) when no voltage is applied | 66 | 67 | 76 | 71 | 94 | 32 |
| Light transmittance (%) when a voltage of 10 V is applied | 0.7 | 0.8 | 0.6 | 0.6 | 0.1 or less | 1.3 |
| Saturation voltage $V_{90}$ (V) | 5.4 | 5.7 | 5.1 | 5.3 | 4.3 | 7.9 |
| response time (10 V/ms) | 62 | 57 | 48 | 67 | 35 | 325 |

TABLE 2-continued

|  | Ex. 1 | Ex. 2 | Ex. 3 | Ex. 4 | Comp. Ex.1 | Comp. Ex.2 |
|---|---|---|---|---|---|---|
| Inversion phenomenon in an intermediate tone | ○ | ○ | ○ | ○ | X | Δ |

(In Table 2,
symbol ○ denotes no inversion phenomenon;
symbol X denotes easily observable inversion phenomenon; and
symbol Δ denotes barely observable inversion phenomenon.)

Thus, it was confirmed that the liquid crystal devices of Examples 1 through 4 exhibited no inversion phenomenon in intermediate tones, were able to be driven by a relatively low voltage as compared with conventional liquid crystal devices, and had excellent display characteristics.

(Comparative Example 3)

A mixture was prepared by mixing the following substances: a photopolymerizable resin material consisting of 0.15 g of a monofunctional acrylate compound MPL-209S (manufactured by Nippon Kayaku K.K.), 0.225 g of lauryl acrylate, and 0.225 g of a fluorine-type resin material KSM-502 (manufactured by Nippon Kayaku K.K.; $\alpha=0.81$); a photopolymerization delaying resin material consisting of 0.15 g of TMI-04; a liquid crystal material consisting of 4.3 g of ZLI-4792 (manufactured by Merck & Co., Inc.; $\Delta n=0.094$), to which a chiral agent S-811 was added in an amount of 0.3%; and a photopolymerization initiator consisting of 0.03 g of Irgacure 651. The mixture was vacuum-injected into the cell under reduced pressure. Thereafter, while maintaining the temperature of the substrate at 110° C. and applying an effective voltage of 2.5 V (60 Hz) between the transparent electrodes, the cell was irradiated with UV-rays for 5 minutes through the first substrate under a high-pressure mercury lamp where a power of 10 mW/cm² was obtained, so as to cure the resin material.

Thereafter, the cell was gradually cooled to 40° C. over 5 hours (while continuing the application of the voltage), further cooled to room temperature (i.e., 25° C.), and was subjected to further irradiation by using the same UV-ray radiation device so as to complete the curing of the resin material.

The liquid crystal cell thus fabricated had the following problems: The liquid crystal material and the photopolymerizable resin material could not be sufficiently homogeneously mixed, so that resin regions were also present within the resultant liquid crystal regions. Moreover, the strength of the liquid crystal cell was insufficient, so that some disturbance in the molecule orientation in the liquid crystal regions was observed when the liquid crystal cell was pressed with a pen. That is, the compatibility between the resin and the liquid crystal was greatly reduced because of the increased number of fluorine atoms in the polymerizable resin.

(Example 5) (TN mode)

A polyimide film of AL4552 (manufactured by Nippon Synthetic Rubber) was applied onto glass substrates (thickness: 1.1 mm) provided with transparent electrodes of ITO (thickness: 50 nm) by spin coating. The substrates were subjected to a rubbing treatment with nylon cloth, and were attached to each other in such a manner that the rubbing directions thereof were perpendicular to each other, with 5 μm spacers being interposed therebetween. Then, a mixture was prepared by homogeneously mixing the following substances: a photopolymerizable resin material consisting of 0.225 g of a monofunctional acrylate (isobornyl acrylate); 0.225 g of a bifunctional acrylate compound KSM-015 (manufactured by Nippon Kayaku K.K.; $\alpha=0.5$), which is a component of the photopolymerizable resin material composition of the present invention; 0.225 g of a bifunctional acrylate compound ($\alpha=0$) represented by the following formula:

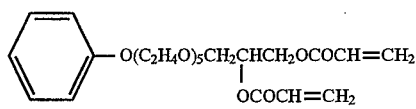

which is also a component of the photopolymerizable resin material composition of the present invention; a photopolymerization delaying resin material consisting of 0.15 g of TMI-04 (manufactured by Nippon Kayaku K.K.), which is also a component of the photopolymerizable resin material composition of the present invention; a liquid crystal material consisting of 4.3 g of ZLI-4792 (manufactured by Merck & Co., Inc.; $\Delta n=0.094$), to which a chiral agent S-811 was added in an amount of 0.3%; and a photopolymerization initiator consisting of 0.03 g of Irgacure 651. After the homogenous mixture was injected into the cell through capillary action, a photomask similar to that used in Example 1 was disposed on the cell. Thereafter, the cell was subjected to the processing steps described in Example 1 so as to produce a TN-mode liquid crystal cell having liquid crystal regions surrounded by polymer walls.

Then, polarizing plates were attached onto the resultant liquid crystal cell in such a manner that the polarizing axes thereof coincided with the respective rubbing directions.

The liquid crystal molecules in the liquid crystal cell uniformly had a TN orientation. Furthermore, no change in the display characteristics was observed when the liquid crystal cell surface was pressed with a pen.

(Example 6)

A mixture was prepared by homogeneously mixing the following substances: a photopolymerizable resin material consisting of 0.36 g of a bifunctional acrylate KSM-015 ($\alpha=0.5$) and 0.09 g of lauryl acrylate; a photopolymerization delaying resin material consisting of 0.15 g of TMI-03 (manufactured by Nippon Kayaku K.K.); a liquid crystal material consisting of 4.4 g of ZLI-4792 (manufactured by Merck & Co., Inc.), to which a chiral agent S-811 was added in an amount of 0.3%; and a photopolymerization initiator consisting of 0.03 g of Irgacure 651. The homogenous mixture was vacuum-injected into a cell produced in accordance with Example 3 under reduced pressure. Thereafter, an effective voltage of 1.5 V (60 Hz) as applied between the opposing electrodes on the cell while maintaining the temperature of the cell filled with the above-mentioned material in a temperature range in which the isotropic liquid crystal phase and the liquid crystal phase can coexist, so as to control the orientation of the liquid crystal molecules. Then, the cell was cooled to a temperature range in which the liquid crystal phase can exist. While maintaining the cell in this temperature range, the cell was irradiated with UV-rays for 10 minutes through the first substrate under a high-pressure mercury lamp at an irradiation power of 5 mW/cm² (365 nm), so as to effect the polymerization of the photopolymerizable resin material and the phase separation between the cured material and the liquid crystal material. Furthermore, the cell was subjected to further irradiation by using the same UV-ray radiation device at room temperature (i.e., 25° C.), so as to complete the polymerization/curing of the resin material.

The liquid crystal cell thus fabricated was observed with a polarizing microscope. The observation showed that, as in Example 3, liquid crystal molecules were oriented in an axially symmetrical manner in a mono-domain state.

Next, a polarizing plates was attached on either side of the liquid crystal cell thus produced in such a manner that the polarizing plates were in a crossed-Nicol state. As in Examples 1 through 4, the electrooptical characteristics of the resultant liquid crystal device were excellent; no inversion phenomenon or roughness in intermediate tones was observed, indicative of excellent viewing angle characteristics.

Furthermore, the liquid crystal display device thus fabricated was subjected to a test where it was preserved at 60° C. for a total of 200 hours. By observing the liquid crystal display device after the test with a polarizing microscope, it was confirmed that the orientation of the liquid crystal molecules was not different before and after the preservation test, indicative of excellent thermal stability of the liquid crystal display device of the present invention. This is considered to be because the increased bifunctional acrylate compound content further increased the cross-linking density of the resultant polymer, thereby enhancing the physical strength of the polymer walls.

(Example 7)

A mixture was prepared by homogeneously mixing the following substances: a photopolymerizable resin material consisting of 0.36 g of a bifunctional acrylate KSM-015 ($\alpha$=0.5) and 0.09 g of lauryl acrylate; a photopolymerization delaying resin material consisting of 0.15 g of TMI-03 (manufactured by Nippon Kayaku K.K.); a liquid crystal material consisting of 4.4 g of ZLI-4801-001 (manufactured by Merck & Co., Inc.), to which a chiral agent S-811 was added in an amount of 0.35%; and a photopolymerization initiator consisting of 0.03 g of Irgacure 651. The homogenous mixture was vacuum-injected into a cell produced in accordance with Example 3 under reduced pressure. Thereafter, a liquid crystal display device was produced in accordance with Example 6, and the electrooptical characteristics thereof were evaluated. The liquid crystal display device exhibited excellent viewing characteristics and excellent thermal stability.

(Example 8)

A mixture was prepared by homogeneously mixing the following substances: a photopolymerizable resin material consisting of 0.36 g of a bifunctional acrylate KSM-052 ($\alpha$=0.39) and 0.09 g of lauryl acrylate; a photopolymerization delaying resin material consisting of 0.15 g of TMI-02 (manufactured by Nippon Kayaku K.K.); a liquid crystal material consisting of 4.4 g of ZLI-4801-001 (manufactured by Merck & Co., Inc.), to which a chiral agent S-811 was added in an amount of 0.35%; and a photopolymerization initiator consisting of 0.03 g of Irgacure 651. The homogenous mixture was vacuum-injected into a cell produced in accordance with Example 3 under reduced pressure. Thereafter, a liquid crystal display device was produced in accordance with Example 6, and the electrooptical characteristics thereof were evaluated.

The liquid crystal display device exhibited excellent viewing characteristics and excellent thermal stability. This is considered to be because the increased content of the bifunctional acrylate compound and the use of the polymerization retarding resin material having a short substituent chain enhanced the physical strength of the polymer walls.

(Example 9)

A mixture was prepared by homogeneously mixing the following substances: a photopolymerizable resin material consisting of 0.36 g of a bifunctional acrylate KSM-051 ($\alpha$=0.6) and 0.09 g of lauryl acrylate; a photopolymerization delaying resin material consisting of 0.15 g of TMI-03 (manufactured by Nippon Kayaku K.K.); a liquid crystal material consisting of 4.4 g of ZLI-792 (manufactured by Merck & Co., Inc.), to which a chiral agent S-811 was added in an amount of 0.3% and a black dichroic dye LCD465 (manufactured by Nippon Kayaku K.K.; incorporating an anthraquinone-type dye material) was added in an amount of 1%; and a photopolymerization initiator consisting of 0.03 g of Irgacure 651. The homogenous mixture was vacuum-injected into a cell produced in accordance with Example 3 under reduced pressure. Thereafter, a liquid crystal display device was produced in accordance with Example 6, and the electrooptical characteristics thereof were evaluated.

The liquid crystal display device was observed with a polarizing microscope. The observation showed that, as in Example 3, liquid crystal molecules were in a mono-domain state, with the liquid crystal molecules within liquid crystal regions having an axially symmetrical orientation. Moreover, the liquid crystal display device exhibited excellent viewing characteristics and excellent thermal stability. It was also confirmed that the liquid crystal display device of the present example is also applicable to a guest-host display mode.

As described above, according to the present invention, a liquid crystal display apparatus using the photopolymerizable resin material composition of the present invention is provided, in which orientations of liquid crystal molecules are axially symmetrical in liquid crystal regions. In such an apparatus, phase separation between the liquid crystal material and the resin material improves, whereby mixing of the resin material into the liquid crystal material is suppressed and anchoring strength of the liquid crystal molecules on the polymer surfaces decreases.

The liquid crystal display apparatus thus produced has the following outstanding characteristics:

1) The improved phase separation between the liquid crystal material and the photopolymerizable resin material allows the liquid crystal molecules to be aligned in an axially symmetrical manner, such as a random shape, a concentric shape, a radial shape, and a spiral-like shape. Therefore, the liquid crystal display apparatus has outstanding omnidirectional viewing angle characteristics, overcoming problems with respect to viewing angle characteristics which are involved in a birefringence display mode such as a twisted nematic (TN) mode and a super-twisted nematic (STN) mode utilizing the optical rotatory power of the conventional liquid crystal material.

2) The liquid crystal molecules are axis-symmetrically aligned, so that viewing angle characteristics are satisfactory. Furthermore, the polymer walls are formed in the cell, so that the apparatus has outstanding shock resistance. In particular, the apparatus can be applied to a large screen display and a pen input apparatus.

3) The alignment regulating force on the substrates can be used in the liquid crystal regions. Therefore, the orientation state of the liquid crystal molecules can be made uniform, and the apparatus has improved resistance to an external pressure such as a pen input.

The liquid crystal display apparatus using the photopolymerizable resin material composition of the present invention preferably can be used for display devices for personal use such as a word processor and a personal computer, and devices used by a number of people such as a portable information terminal (in particular, those placed on a table used by 2 to 4 people).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A photopolymerizable resin material composition for forming a polymer used for a liquid crystal display apparatus, comprising at least one acrylate compound selected from the group consisting of a bifunctional acrylate compound represented by the following general Formula I having a fluorine substitution ratio α in the range of 0.1<α<0.8, a bifunctional acrylate compound represented by the following general Formula II having a fluorine substitution ratio α in the range of 0≦α<0.8, a bifunctional acrylate compound represented by the following general Formula III having a fluorine substitution ratio α in the range of 0.1<α<0.8, a bifunctional acrylate compound represented by the following general Formula IV having a fluorine substitution ratio α in the range of 0.1<α<0.8 and a bifunctional acrylate compound represented by the following general Formula V having a fluorine substitution ratio α in the range of 0.1<α<0.8 and a bifunctional acrylate compound represented by the following general Formula VI having a fluorine substitution ratio α in the range of 0.1<α<0.8, and a photopolymerization delaying resin material represented by the following general Formula VII:

A—B—X¹—E—A    (I)

where A is an acrylate group or a methacrylate group; B is an alkylene group, an alkyleneoxyalkylene group, alkyleneoxyalkyleneoxyalkylene group, an alkylenecarbonyloxyalkylene group, or carbonyloxyalkylene group; X¹ is an alkylene group substituted with fluorine; and E is an alkylene group, an alkyleneoxyalkylene group, an alkylenecarbonyloxyalkylene group, or a carbonyloxyalkylene group,

Y¹—CH₂CHCH₂—A    (II)
         |
         A where A is an acrylate group or a methacrylate group; and Y¹ is an alkyl group substituted with fluorine, an alkyl group, an aryloxy group, an alkyloxy group containing 8 to 13 carbon atoms, a phenoxy group, an alkyl phenoxy group, or a Z¹O(C₂H₄O)ₚ group (where Z¹ is a phenyl group or a dodecyl group and p is an integer of 5 to 15), Y²—CH₂CHCH₂O—D—OCH₂CHCH₂—Y²    (III)
         |                    |
         A                    A

Y²—CH₂CHO—D—OCHCH₂—Y²    (IV)
       |          |
       CH₂A      CH₂A

Y²—CH₂CHCH₂O—D—OCHCH₂—Y²    (V)
         |            |
         A           CH₂A where A is an acrylate group or a methacrylate group, Y² is an alkyl group substituted with fluorine; and D is a —CONH(CH₂)₆NHCO— group, a mixture of —CONHCH₂C(CH₃)₂—CH₂CH(CH₃)CH₂CH₂NHCO— group and —CONHCH₂CH(CH₃)—CH₂CH(CH₃)₂CH₂CH₂NHCO— group,

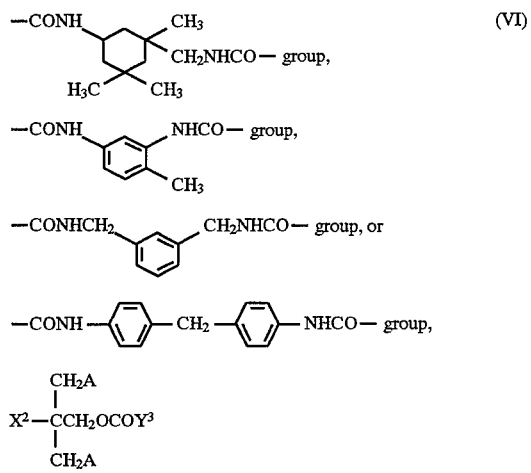

(VI)

$$\begin{array}{c} CH_2A \\ | \\ X^2—CCH_2OCOY^3 \\ | \\ CH_2A \end{array}$$

where A is an acrylate group or a methacrylate group; X² is an alkyl group or an alkylcarbonyloxyalkylene group; and Y³ is an alkyl group substituted with fluorine,

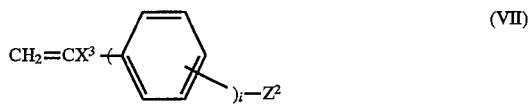

(VII)

where X³ is hydrogen, a methyl group, or a phenyl group; Z² is hydrogen, an alkyl group substituted with fluorine, an alkyl group, an alkoxy group substituted with fluorine, an alkyl group substituted with phenyl, a —C(CH₃)₂—NHCOOR group (where R is an alkyl group and an alkyl group substituted with fluorine),

—C(CH₃)₂—NHCOOCH₂C(CH₃)₂CH₂OCONHC(CH₃)₂—

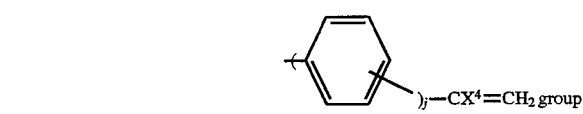

or —C(CH₃)₂NHCOOC₂H₄OCOCX⁴=CH₂ group (where X⁴ is hydrogen or a methyl group, and j is an integer of 1 or 2), and i is an integer of 1 or 2.

2. A cured material obtained by photopolymerizing the photopolymerizable resin material composition of claim 1.

3. A liquid crystal display apparatus having a liquid crystal region surrounded by a cured material obtained by photopolymerizing the photopolymerizable resin material composition of claim 1.

4. A liquid crystal display apparatus according to claim 3, wherein orientations of liquid crystal molecules in the liquid crystal region surrounded by the cured substance are axially symmetrical.

* * * * *